(12) United States Patent
Tanaka

(10) Patent No.: US 9,123,280 B2
(45) Date of Patent: Sep. 1, 2015

(54) IMAGE DISPLAY DEVICE AND IMAGE DISPLAY METHOD

(75) Inventor: Yuhji Tanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 232 days.

(21) Appl. No.: 13/703,439

(22) PCT Filed: May 13, 2011

(86) PCT No.: PCT/JP2011/061026
§ 371 (c)(1),
(2), (4) Date: Dec. 11, 2012

(87) PCT Pub. No.: WO2011/162040
PCT Pub. Date: Dec. 29, 2011

(65) Prior Publication Data
US 2013/0093802 A1   Apr. 18, 2013

(30) Foreign Application Priority Data

Jun. 23, 2010 (JP) ................................. 2010-142767

(51) Int. Cl.
*G09F 13/04* (2006.01)
*G09G 5/10* (2006.01)
(Continued)

(52) U.S. Cl.
CPC .................. *G09G 5/10* (2013.01); *G09G 3/003* (2013.01); *G09G 3/3426* (2013.01); *G02F 1/133602* (2013.01); *G09G 3/3413* (2013.01); *G09G 2320/0233* (2013.01); *G09G 2320/0247* (2013.01); *G09G 2320/0646* (2013.01);
(Continued)

(58) Field of Classification Search
CPC ... G02F 1/133602; G09G 3/3426; G09G 5/10
USPC .................................................. 345/88, 102
See application file for complete search history.

(56) References Cited

U.S. PATENT DOCUMENTS

2002/0057247 A1* 5/2002 Lee et al. ......................... 345/88
2008/0150969 A1* 6/2008 Sagano et al. ................. 345/690
(Continued)

FOREIGN PATENT DOCUMENTS

| JP | 2005-241678 A | 9/2005 |
|---|---|---|
| WO | 2009/054223 A1 | 4/2009 |

(Continued)

OTHER PUBLICATIONS

Official Communication issued in International Patent Application No. PCT/JP2011/061026, mailed on Aug. 2, 2011.

*Primary Examiner* — Koosha Sharifi-Tafreshi
*Assistant Examiner* — Joseph G Rodriguez
(74) *Attorney, Agent, or Firm* — Keating & Bennett, LLP

(57) ABSTRACT

When first and second region-processing sections (510, 520) calculate in parallel backlight luminances required for an input image halved by a regional image division section (505) included in an area-active drive processing section (5) of a liquid crystal display device, LED data ($D_{b1}$, $D_{b2}$) are exchanged for each other, allowing reference to backlight luminances not calculated for one region but calculated for the other region. As a result, when an area is illuminated by surrounding backlight sources, the actual display luminance can be calculated correctly. Thus, pixel display can be provided with correct display tones across the entire screen, thereby preventing a reduction in display quality.

9 Claims, 23 Drawing Sheets

(51) Int. Cl.
*G09G 3/00* (2006.01)
*G02F 1/1335* (2006.01)
*G09G 3/34* (2006.01)

(52) U.S. Cl.
CPC .. *G09G2320/0653* (2013.01); *G09G 2330/021* (2013.01); *G09G 2340/16* (2013.01); *G09G 2360/16* (2013.01)

(56) References Cited

U.S. PATENT DOCUMENTS

2009/0303171 A1* 12/2009 Chang et al. .................. 345/102
2010/0123839 A1* 5/2010 Lu .................................. 349/15
2010/0225574 A1 9/2010 Fujiwara et al.
2011/0090265 A1 4/2011 Muroi et al.
2011/0115826 A1 5/2011 Fujiwara
2011/0115827 A1 5/2011 Tanaka

FOREIGN PATENT DOCUMENTS

| WO | 2009/096068 A1 | 8/2009 |
| WO | 2010/001681 A1 | 1/2010 |
| WO | 2010/024009 A1 | 3/2010 |

* cited by examiner

IMAGE DISPLAY DEVICE AND IMAGE DISPLAY METHOD

TECHNICAL FIELD

The present invention relates to image display devices, particularly to an image display device with the function of controlling the luminance of a backlight (backlight dimming function).

BACKGROUND ART

Image display devices provided with backlights, such as liquid crystal display devices, can control the luminances of the backlights on the basis of input images, thereby suppressing power consumption by the backlights and improving the quality of display images. In particular, by dividing a screen into a plurality of areas and controlling the luminances of backlight sources corresponding to the areas on the basis of portions of an input image within the areas, it is rendered possible to achieve lower power consumption and higher image quality. Hereinafter, such a method for driving a display panel while controlling the luminances of backlight sources on the basis of input image portions within areas will be referred to as "area-active drive".

Liquid crystal display devices of area-active drive type use, for example, LEDs (light emitting diodes) of three colors, i.e., R, G and B, and LEDs of white as backlight sources. Luminances of LEDs corresponding to areas are obtained on the basis of, for example, maximum or mean pixel luminances within the areas, and provided to a backlight driver circuit as LED data. In addition, display data (data for controlling the light transmittance of the liquid crystal) is generated on the basis of the LED data and an input image, and the display data is provided to a liquid crystal panel driver circuit. Note that the luminance of each pixel on the screen is the product of the luminance of light from the backlight and the light transmittance based on the display data. Here, light emitted by one LED is incident on a plurality of areas around one corresponding area. Accordingly, the luminance of each pixel is the product of the total luminance of light emitted by a plurality of LEDs and the light transmittance based on the display data.

In the liquid crystal display devices as mentioned above, the display data and the LED data are appropriately obtained on the basis of an input image, the light transmittance of the liquid crystal is controlled on the basis of the display data, and luminances of LEDs corresponding to areas are controlled on the basis of the LED data, so that the input image can be displayed on the liquid crystal panel. In addition, when luminances of pixels within an area are low, luminances of LEDs corresponding to that area are kept low, thereby reducing power consumption by the backlight.

In relevance to such area-active drive liquid crystal display devices, for example, Japanese Laid-Open Patent Publication No. 2005-241678 discloses a configuration including a plurality of backlight sources, in which a screen is divided into a plurality of areas corresponding to the backlight sources, and the backlight sources are controlled independently of each other in accordance with the brightness of their corresponding areas of the divided screen. This configuration allows power consumption to be effectively reduced without having to wait for features of the entire screen to be extracted.

CITATION LIST

Patent Document

Patent Document 1: Japanese Laid-Open Patent Publication No. 2005-241678

SUMMARY OF THE INVENTION

Problems to be Solved by the Invention

In recent years, such area-active drive liquid crystal display devices have screens so large that if luminances of backlight sources are sequentially computed on an area-by-area basis of divided screens, such computations might not be completed in time. Therefore, it is conceivable that the luminances of the backlight sources might be computed in parallel.

However, if the computation of each screen area is performed independently of and in parallel with another area, the luminances of the backlight sources are obtained without considering their luminances being obtained on the basis of other computations. While this causes no problem if each area is illuminated by only one backlight source, a problem arises if each area is illuminated not only by a backlight source immediately therebelow but also by its surrounding backlight sources. Specifically, if a plurality of computations are performed independently of each other, the brightness of actually displayed pixels is caused to change by any backlight sources not considered by each respective computation, resulting in a problem of reduced display quality.

Furthermore, conventionally, to prevent drastic changes in luminances of backlight sources, a time constant to delay such a luminance change might be set for computing the luminances of the backlight sources. As a result, it is possible to inhibit flicker from being visually recognized due to a drastic brightness change (between frames, for example). However, in the case where such computations as above are performed in parallel every unit frame time (e.g., separately between even-frame and odd-frame images), if the time constant is set, the luminance change occurs very slowly, resulting in problems of reduced display quality and increased power consumption.

Furthermore, in the case of images whose brightness can significantly change between frames (typically, a three-dimensional video in which left-eye and right-eye images change every frame), it is often the case that the image brightness does not change every two frames, and therefore if such parallel computations as above are performed separately for even-frame and odd-frame images, flicker might rather occur, resulting in a problem of reduced display quality.

Therefore, an objective of the present invention is to provide an image display device and an image display method which prevent display quality from being reduced due to parallel computations of backlight source luminances.

Solution to the Problems

A first aspect of the present invention is directed to an image display device with a function of controlling a backlight luminance, comprising:

a display panel including a plurality of display elements for controlling light transmittances;

a backlight including a plurality of light sources;

an image division section for generating a plurality of input images by subjecting a plurality of images included in a plurality of frames of an externally provided video signal to either regional division within each frame or temporal division in units of a frame, or both;

a plurality of luminance calculation sections for setting a plurality of areas in accordance with the light sources for the plurality of the input images, processing the plurality of input images in parallel on the basis of the input image for the set areas, to calculate emission luminance data specifying luminance upon emission of the light source corresponding to the areas, and processing the plurality of input images in parallel on the basis of the emission luminance data calculated for the areas and its predetermined surrounding areas, to calculate display luminance, which is luminance for display provided in the areas;

a display data calculation section for obtaining display data to control the light transmittances of the display elements, on the basis of the input images and the display luminances obtained by the luminance calculation sections;

a panel driver circuit for outputting signals to the display panel on the basis of the display data, said signals controlling the light transmittances of the display element; and a backlight driver circuit for outputting signals to the backlight on the basis of the emission luminance data, said signals controlling the luminances of the light sources, wherein, each of the luminance calculation sections receives other emission luminance data calculated by the other luminance calculation sections or values for calculating said other emission luminance data, and calculates the display luminance on the basis of the received other emission luminance data or values.

In a second aspect of the present invention, based on the first aspect of the invention, the image division section generates the input images through regional division of the image included in the video signal, each of the plurality of luminance calculation sections includes a plurality of emission luminance calculation sections for obtaining the emission luminance data respectively corresponding to the input images through parallel processing and a plurality of display luminance calculation sections for obtaining the display luminances respectively corresponding to the input images through parallel processing, and each of the display luminance calculation sections receives other emission luminance data from other emission luminance calculation sections and calculates the display luminance on the basis of the received other emission luminance data and the emission luminance data calculated by the corresponding emission luminance calculation sections, said other emission luminance data being calculated by the other emission luminance calculation sections corresponding to the other display luminance calculation sections and at least including emission luminance data for a plurality of areas being set for predetermined regions adjacent to corresponding input image.

In a third aspect of the present invention, based on the first aspect of the invention, the image division section generates the input images through regional division of the image included in the video signal, each of the plurality of luminance calculation sections includes a plurality of emission luminance calculation sections for obtaining the emission luminance data corresponding to the input images through parallel processing and a plurality of display luminance calculation sections for obtaining the display luminances corresponding to the input images through parallel processing, each of the display luminance calculation sections calculates candidate values for emission luminance data for a plurality of areas being set for a corresponding input image and predetermined regions adjacent to the input image, receives candidate values for other emission luminance data calculated by the other emission luminance calculation sections, and obtains emission luminance data to be provided to a corresponding display luminance calculation section, on the basis of the received candidate values for the other emission luminance data and the calculated candidate values for the emission luminance data, and the display luminance calculation sections calculate the display luminances on the basis of the emission luminance data provided by the corresponding emission luminance calculation sections.

In a fourth aspect of the present invention, based on the third aspect of the invention, the emission luminance calculation section obtains the maximum of the candidate values for the received other emission luminance data and the calculated emission luminance data as emission luminance data to be provided to the corresponding display luminance calculation section.

In a fifth aspect of the present invention, based on the third aspect of the invention, the emission luminance calculation section obtains an intermediate value as emission luminance data to be provided to the corresponding display luminance calculation section, the intermediate value being defined by a predetermined ratio between the maximum and the minimum of the candidate values for the received other emission luminance data and the emission luminance data calculated by the emission luminance calculation section.

In a sixth aspect of the present invention, based on the first aspect of the invention, the image division section generates the input images through temporal division of the image included in the video signal, each of the plurality of luminance calculation sections includes a plurality of emission luminance calculation sections for obtaining the emission luminance data respectively corresponding to the input images through parallel processing and a plurality of display luminance calculation sections for obtaining the display luminances respectively corresponding to the input images through parallel processing, and when the emission luminance data calculated by a corresponding emission luminance calculation section changes from other emission luminance data calculated by another emission luminance calculation section and corresponding to an input image provided immediately before its corresponding input image and the change is greater than or equal to a predetermined threshold, the display luminance calculation section calculates the display luminance on the basis of emission luminance data obtained by subtracting a predetermined amount less than the threshold from the other emission luminance data.

In a seventh aspect of the present invention, based on the sixth aspect of the invention, the image division section receives a three-dimensional video signal alternating between left-eye and right-eye images frame by frame, and sorts the received three-dimensional video signal alternatingly in units of a frame, thereby generating the input images consisting of input images that are the left-eye images and input images that are the right-eye images.

In an eighth aspect of the present invention, based on the first aspect of the invention, the image division section generates a plurality of input images through regional division within each frame after the image included in the video signal is temporally divided in units of a frame, each of the plurality of luminance calculation sections includes a plurality of emission luminance calculation sections for performing parallel processing to obtain the emission luminance data respectively corresponding to the input images within the same frame, the number of emission luminance calculation sections corresponding to the number of partitions of temporal divisions, and the parallel processing being performed frame by frame and a plurality of display luminance calculation sections for performing parallel processing to obtain the display luminances respectively corresponding to the input images within the same frame, the number of display luminance calculation sections corresponding to the number of partitions of temporal divisions, and the parallel processing being performed frame by frame, and when the emission luminance data calculated by a corresponding emission luminance calculation section changes from other emission luminance data calculated by another emission luminance calculation section and corresponding to an input image provided immediately before its corresponding input image, and the change is greater than or equal to a predetermined threshold, the display luminance calculation section calculates the display luminance on the basis of emission luminance data obtained by subtracting a predetermined amount less than the threshold from the other emission luminance data.

In a ninth aspect of the present invention, based on the first aspect of the invention, each of the plurality of luminance calculation sections transmits the calculated other emission luminance data or values for calculating said other emission luminance data, in synchronization with a vertical synchronization signal included in the video signal.

A tenth aspect of the present invention is directed to a method for controlling an image display device having a function of controlling a backlight luminance and being provided with a backlight including light sources and a display panel including a plurality of display elements for displaying a plurality of pixels by transmitting light from the light sources therethrough, the method comprising:

an image division step of generating a plurality of input images by subjecting a plurality of images included in a plurality of frames of an externally provided video signal to either regional division within each frame or temporal division in units of a frame, or both;

a plurality of luminance calculation steps of setting a plurality of areas in accordance with the light sources for the plurality of input images, processing the plurality of input images in parallel on the basis of the input image for the set areas, to calculate emission luminance data specifying luminance upon emission of the light source corresponding to each of the areas, and processing the plurality of input images in parallel on the basis of the emission luminance data calculated for the areas and its predetermined surrounding areas, to calculate display luminance, which is luminance for display provided in the areas;

a display data calculation step of obtaining display data to control the light transmittances of the display elements, on the basis of the input images and the display luminances obtained by the luminance calculation steps;

a panel drive step of outputting signals to the display panel on the basis of the display data, said signals controlling the light transmittances of the display element; and a backlight drive step of outputting signals to the backlight on the basis of the emission luminance data, said signals controlling the luminances of the light sources, wherein, in each of the luminance calculation steps, other emission luminance data calculated in other luminance calculation steps or values for calculating said other emission luminance data are received, and the display luminance is calculated on the basis of the received other emission luminance data or values.

EFFECT OF THE INVENTION

According to the first aspect of the present invention, each of the luminance calculation sections receives other emission luminance data calculated by the other luminance calculation sections or values for calculating these other emission luminance data, and calculates the display luminances on the basis of the received other emission luminance data or values, and therefore a reduction in display quality can be diminished by referencing other backlight luminances not computed by that luminance calculation section.

According to the second aspect of the present invention, the image division section performs regional division on an image, thereby generating a plurality of input images, and each of the luminance calculation sections receives other emission luminance data from the other emission luminance calculation sections, and calculates the display luminances on the basis of the received other emission luminance data and the emission luminance data calculated by the corresponding emission luminance calculation sections, the other emission luminance data being calculated by the other emission luminance calculation sections corresponding to the other display luminance calculation sections and at least including emission luminance data for a plurality of areas being set for predetermined regions adjacent to corresponding input images, which makes it possible to accurately calculate an actual display luminance for each area being illuminated by surrounding backlight sources, by referencing other backlight luminances not computed therefor. Thus, pixel display can be provided with correct display tones across the entire screen, thereby preventing a reduction in display quality.

According to the third aspect of the present invention, the image division section performs regional division on an image, thereby generating a plurality of input images, and each of the luminance calculation sections calculates candidate values for emission luminance data for a plurality of areas being set for a corresponding input image and predetermined regions adjacent to the input image, receives candidate values for other emission luminance data calculated by the other emission luminance calculation sections, and obtains emission luminance data, which makes it possible to resolve or relieve insufficient luminance in accordance with selected candidate values or reduce power consumption even if insufficient luminance occurs.

According to the fourth aspect of the present invention, the maximum of the candidate values for the emission luminance data is obtained as emission luminance data, making it possible to resolve insufficient luminance and prevent a reduction in display quality.

According to the fifth aspect of the present invention, an intermediate value defined by a predetermined ratio between the maximum and the minimum of the candidate values for emission luminance data is obtained as emission luminance data, which makes it possible to inhibit occurrence of insufficient luminance and prevent a reduction in display quality, and the closer the intermediate value used is to the minimum value, the more power consumption can be reduced. In addition, the intermediate value can be arbitrarily set in accordance with the need to enhance display quality and reduce power consumption.

According to the sixth aspect of the present invention, the image division section performs temporal division on an image, thereby generating a plurality of input images, and when the emission luminance data calculated by a corresponding emission luminance calculation section changes from emission luminance data corresponding to an input image provided immediately before its corresponding input image, and the change is greater than or equal to a predetermined threshold, the display luminance calculation section calculates the display luminance on the basis of emission luminance data obtained by subtracting a predetermined amount less than the threshold from other emission luminance data, which makes it possible to avoid delaying changes in backlight luminance with respect to changes (in tone) of input images. Thus, it is possible to prevent a reduction in display quality and reduce power consumption in such a case where no reduction in display quality would occur.

According to the seventh aspect of the present invention, it is possible to inhibit flicker caused by a frame-by-frame luminance change which occurs when the image division section sorts a three-dimensional video signal alternatingly in units of a frame because in such a case, the brightness of light sources often varies therebetween due to the position of a display image being different between left-eye and right-eye images.

According to the eighth aspect of the present invention, the display luminance calculation section has the features of both the second and sixth aspects of the present invention, and therefore it is possible to achieve the same effects as all of those achieved by the second and sixth aspects of the invention.

According to the ninth aspect of the present invention, the luminance calculation sections pass/receive emission luminance data in synchronization with a vertical synchronization signal included in a video signal, so that the entire device can be accurately timed using a simplified configuration.

According to the tenth aspect of the present invention, the same effect as that achieved by the first aspect of the invention can be achieved by an image display device control method.

MODES FOR CARRYING OUT THE INVENTION

Hereinafter, embodiments of the present invention will be described with reference to the accompanying drawings.

<1. First Embodiment>
<1. Overall Configuration and Overview of the Operation>

Figure 1:
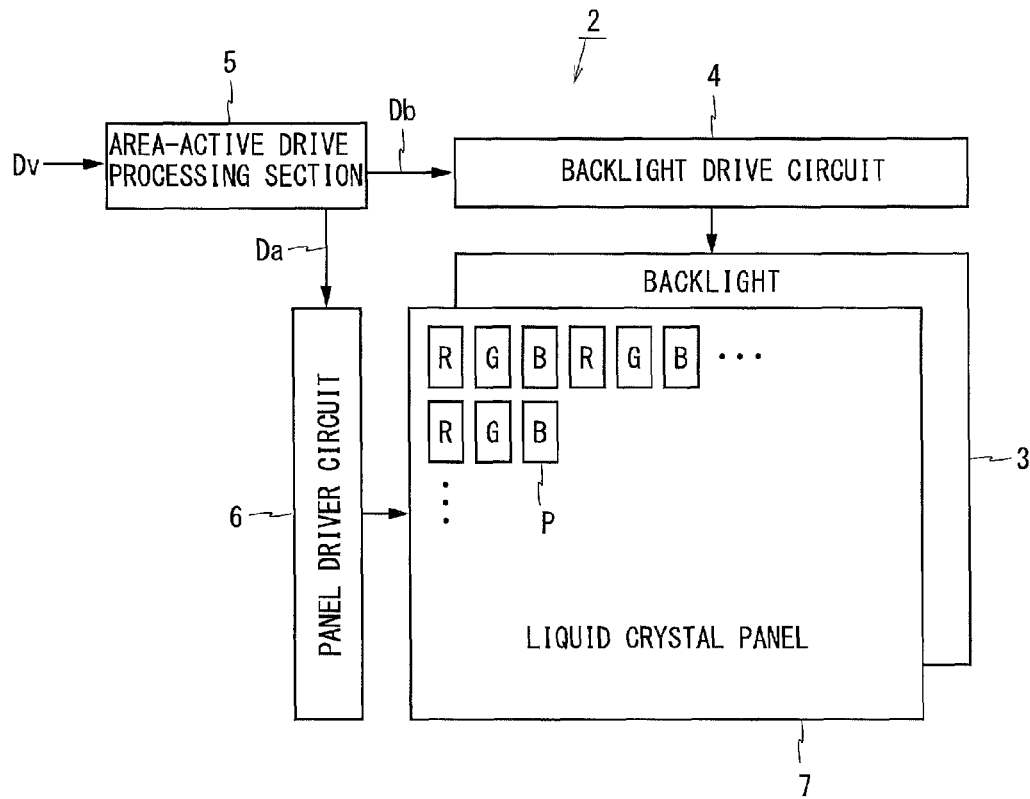
FIG. 1 is a block diagram illustrating the configuration of a liquid crystal display device according to a first embodiment of the present invention.

FIG. 1 is a block diagram illustrating the configuration of a liquid crystal display device 2 according to a first embodiment of the present invention. The liquid crystal display device 2 shown in FIG. 1 includes a backlight 3, a backlight driver circuit 4, a panel driver circuit 6, a liquid crystal panel 7, and an area-active drive processing section 5. The liquid crystal display device 2 performs area-active drive in which the liquid crystal panel 7 is driven with luminances of backlight sources being controlled on the basis of input image portions within a plurality of areas defined by dividing the screen. In the following, m and n are integers of 2 or more, i and j are integers of 1 or more, but at least one of i and j is an integer of 2 or more.

The liquid crystal display device 2 receives a signal which indicates an input image $D_v$ including an R image, a G image, and a B image (hereinafter, the signal will also be simply referred to as the input image $D_v$). Each of the R, G, and B images includes luminance data for (m×n) pixels. On the basis of the input image $D_v$, the area-active drive processing section 5 obtains display data (hereinafter, referred to as "liquid crystal data $D_a$") for use in driving the liquid crystal panel 7 and backlight control data (hereinafter, referred to as "LED data $D_b$") for use in driving the backlight 3 (details will be described later).

The liquid crystal panel 7 includes (m×n×3) display elements P. The display elements P are arranged two-dimensionally as a whole, with each row including 3m of them in its direction (in FIG. 1, horizontally) and each column including n of them in its direction (in FIG. 1, vertically). The display elements P include R, G, and B display elements respectively transmitting red, green, and blue light therethrough. Each set of three display elements, i.e., R, G, and B, arranged in the row direction forms a single pixel.

Note that the liquid crystal panel 7 has a number of display elements P, which include a liquid crystal, but shutter elements made of a well-known substance with electro-optical properties allowing the transmittance of light from the backlight 3 to be controlled may be used in place of the liquid crystal.

The panel driver circuit 6 is a circuit for driving the liquid crystal panel 7. On the basis of the liquid crystal data $D_a$ outputted by the area-active drive processing section 5, the panel driver circuit 6 outputs signals (voltage signals) to the liquid crystal panel 7 to control light transmittances of the display elements P. The voltages outputted by the panel driver circuit 6 are written to pixel electrodes (not shown) in the display elements P, and the light transmittances of the display elements P change in accordance with the voltages written to the pixel electrodes.

Figure 2:
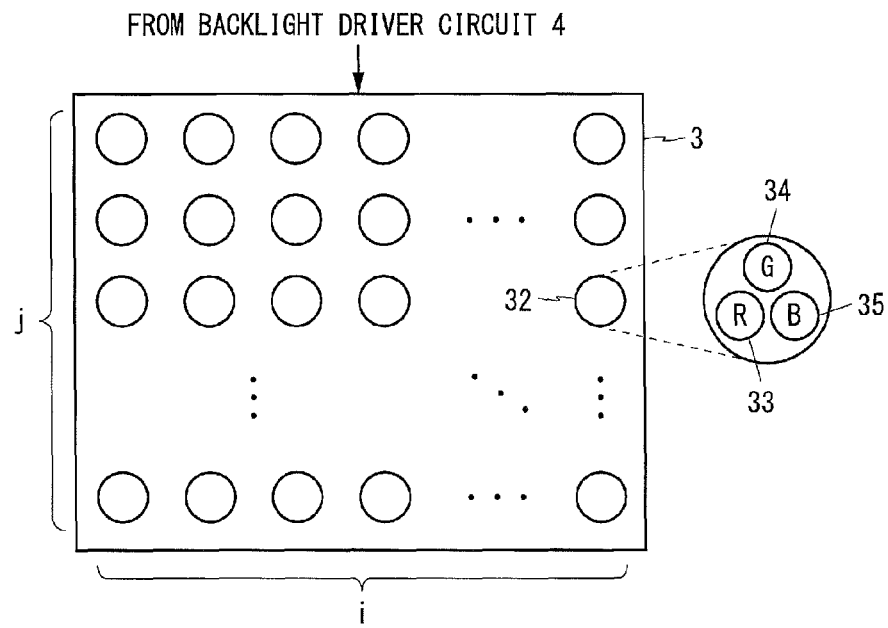
FIG. 2 is a diagram illustrating details of a backlight shown in FIG. 1.

The backlight 3 is provided at the back side of the liquid crystal panel 7 to irradiate backlight to the back of the liquid crystal panel 7. FIG. 2 is a diagram illustrating details of the backlight 3. The backlight 3 includes (i×j) LED units 32, as shown in FIG. 2. The LED units 32 are arranged two-dimensionally as a whole, with each row including i of them in its direction and each column including j of them in its direction. Each of the LED units 32 includes one red LED 33, one green LED 34, and one blue LED 35. The three LEDs 33 to 35 included in each LED unit 32 emit light to be incident on a part of the back of the liquid crystal panel 7.

Note that the LED units 32 may be sets of LEDs emitting colors other than R, G, and B, or may be white LEDs where the luminance does not vary between colors. In addition, the backlight 3 preferably includes LEDs whose luminance can be adjusted at high speed, but other well-known light sources, e.g., CCFLs (cold cathode fluorescent lamps), may be used.

The backlight driver circuit 4 is a circuit for driving the backlight 3. On the basis of the LED data $D_b$ outputted by the area-active drive processing section 5, the backlight driver circuit 4 outputs signals (voltage signals or current signals) to the backlight 3 to control luminances of the LEDs 33 to 35. The luminances of the LEDs 33 to 35 are controlled independently of luminances of LEDs inside and outside their units.

The screen of the liquid crystal display device 2 is divided into (i×j) areas, each corresponding to one LED unit 32. Note that, in another configuration, each area may correspond to two or more LED units 32. For each of the (i×j) areas, the area-active drive processing section 5 obtains the luminance of the red LEDs 33 that correspond to that area on the basis of an R image within the area. Similarly, the luminance of the green LEDs 34 is determined on the basis of a G image within the area, and the luminance of the blue LEDs 35 is determined on the basis of a B image within the area. The area-active drive processing section 5 obtains luminances for all LEDs 33 to 35 included in the backlight 3, and outputs LED data $D_b$ representing the obtained LED luminances to the backlight driver circuit 4.

Furthermore, on the basis of the LED data $D_b$, the area-active drive processing section 5 obtains backlight luminances for all display elements P included in the liquid crystal panel 7. In addition, on the basis of an input image $D_v$ and the backlight luminances, the area-active drive processing section 5 obtains light transmittances of all of the display elements P included in the liquid crystal panel 7, and outputs liquid crystal data $D_a$ representing the obtained light transmittances to the panel driver circuit 6. Note that the method for the area-active drive processing section 5 to obtain the backlight luminances will be described in detail later.

In the liquid crystal display device 2, the luminance of each R display element is the product of the luminance of red light emitted by the backlight 3 and the light transmittance of that R display element. Light emitted by one red LED 33 is incident on a plurality of areas around one corresponding area. Accordingly, the luminance of each R display element is the product of the total luminance of light emitted by a plurality of red LEDs 33 and the light transmittance of that R display element. Similarly, the luminance of each G display element is the product of the total luminance of light emitted by a plurality of green LEDs 34 and the light transmittance of that G display element, and the luminance of each B display element is the product of the total luminance of light emitted by a plurality of blue LEDs 35 and the light transmittance of that B display element.

In the liquid crystal display device 2 thus configured, the liquid crystal data $D_a$ and the LED data $D_b$ are appropriately obtained on the basis of the input image $D_v$, the light transmittances of the display elements P are controlled on the basis of the liquid crystal data $D_a$, and the luminances of the LEDs 33 to 35 are controlled on the basis of the LED data $D_b$, so that the input image $D_v$ can be displayed on the liquid crystal panel 7. In addition, when luminances of pixels within an area are low, luminances of LEDs 33 to 35 corresponding to that area are kept low, thereby reducing power consumption by the backlight 3. Moreover, when luminances of pixels within an area are low, luminances of display elements P corresponding to that area are switched at lower levels, making it possible to enhance image resolution and thereby to improve display image quality.

<1.2 Configuration of the Area-active Drive Processing Section>

Figure 3:
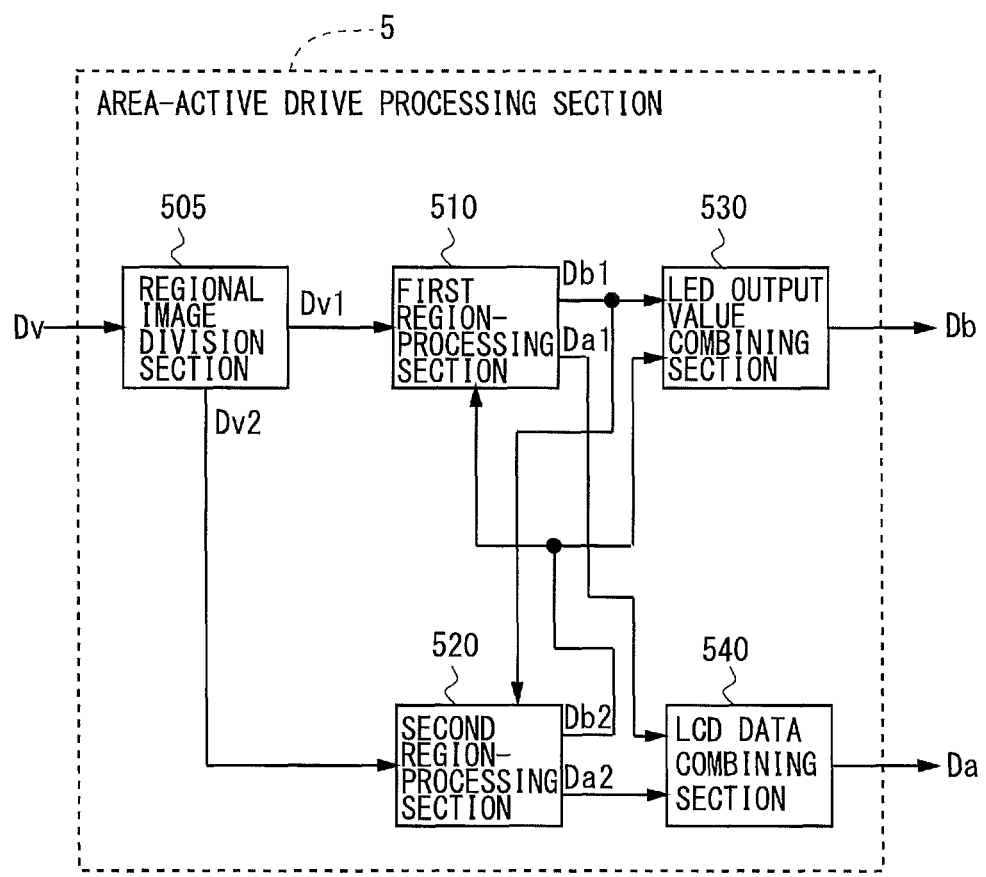
FIG. 3 is a block diagram illustrating in detail the configuration of an area-active drive processing section in the embodiment.

FIG. 3 is a block diagram illustrating in detail the configuration of the area-active drive processing section 5 in the present embodiment. To divide an input image for parallel processing, the area-active drive processing section 5 shown in FIG. 3 includes a regional image division section 505, first and second region-processing sections 510 and 520, an LED output value combining section 530, and an LCD data combining section 540.

As described earlier, area-active drive liquid crystal display devices have screens so large that if the brightness of backlight sources is sequentially computed on an area-by-area basis of divided screens, such computations might not be completed in time. Therefore, in the present embodiment, an input image $D_v$ is halved by the regional image division section 505, and the first and second region-processing sections 510 and 520 compute the brightness of backlight sources in parallel.

In the parallel computations, the first and second region-processing sections 510 and 520 exchange LED data (emission luminance data) $D_{b1}$ and $D_{b2}$, which are calculated backlight luminance data, with each other, to reference backlight luminances in each other's regions, which are not computed for their respective regions. As a result, when an area is illuminated by backlight sources in that area and its surrounding areas, a display luminance equivalent to the actual brightness of the area can be correctly computed (concretely, a luminance distribution can be correctly computed). Thus, pixel display can be provided with correct display tones across the entire screen, thereby preventing a reduction in display quality.

Note that the LED data $D_{b1}$ and $D_{b2}$ have been described here as being exchanged for each other, but the first region-processing section 510 does not require the LED data $D_{b2}$ in its entirety. Specifically, an image region targeted for computation by the first region-processing section 510 is not affected by all backlight sources corresponding to an image region not targeted for computation (the image region being targeted for computation by the second region-processing section 520), and it is simply affected by its adjacent areas or its nearby areas (within a range of up to a few areas away, for example). Accordingly, the LED data $D_{b1}$ and $D_{b2}$ to be exchanged may be partial data corresponding to a range to be affected, concretely, data portions corresponding to areas adjacent to or near each other's regions.

Furthermore, in a conceivable parallel processing method, the screen is not divided into regions as described above but into time domains. For example, in a conceivable configuration, computations for even-frame and odd-frame screens are performed in parallel. Such a configuration will be described in a fourth embodiment.

Liquid crystal data $D_{a1}$ and $D_{a2}$, which are pixel values calculated by the first and second region-processing sections 510 and 520, are combined by the LCD data combining section 540 and provided to the panel driver circuit 6 as integrated liquid crystal data $D_a$. Moreover, the calculated LED data $D_{b1}$ and $D_{b2}$ are combined by the LED output value combining section 530 and provided to the backlight driver circuit 4 as integrated LED data $D_b$.

Note that in the present embodiment, the panel driver circuit 6 includes a data driver (and a gate driver) to drive a liquid crystal panel, but a conceivable configuration includes a left-screen data driver for driving the left half of the liquid crystal panel and a right-screen data driver for driving the right half. In such a configuration, the LCD data combining section 540 may be omitted, so that liquid crystal data $D_{a1}$ for pixel values calculated by the first region-processing section 510 may be directly provided to the right-screen data driver, and liquid crystal data $D_{a2}$ for pixel values calculated by the second region-processing section 520 may be directly provided to the left-screen data driver. Moreover, a display device including two liquid crystal panels can be driven in the same manner as the above configuration.

Furthermore, in the present embodiment, an LED data calculation section is provided in each of the first and second region-processing sections for the purpose of parallel computations, but if at least display luminance calculation sections perform parallel computations, it is not necessary for liquid crystal data to be calculated by parallel computations. Accordingly, one LED data calculation section may be provided in place of two LED data calculation sections, in order to calculate integrated liquid crystal data $D_a$ on the basis of received display luminances corresponding to input images outputted by the display luminance calculation sections respectively provided in the first and second region-processing sections.

Figures 4, 5:
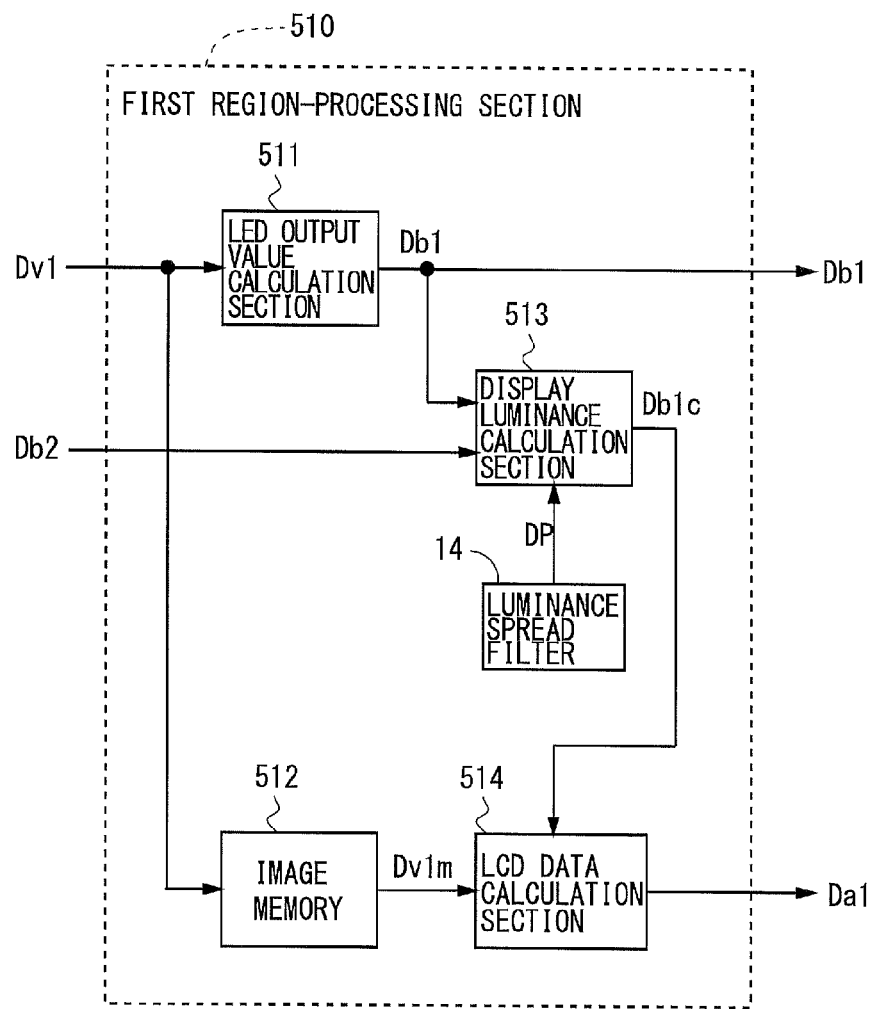
FIG. 4 is a block diagram illustrating in detail the configuration of a first region-processing section in the embodiment.
FIG. 5 is a diagram describing a luminance spread filter.

Referring next to FIG. 4, the configuration of the first region-processing section 510 in the present embodiment will be described in detail. Note that the configuration of the second region-processing section 520 is the same in detail as the first region-processing section 510, and therefore any description thereof will be omitted.

<1.3 Configuration of the First Region Processing Section>

FIG. 4 is a block diagram illustrating in detail the configuration of the first region-processing section in the present embodiment. The first region-processing section 510 includes an LED output value calculation section 511, image memory 512, a display luminance calculation section 513, and an LCD data calculation section 514 as components for performing predetermined processing, and also includes a luminance spread filter 14 as shown in FIG. 5, as a component for storing predetermined data to be described later. Here, in the present embodiment, the LED output value calculation section 511 realizes an emission luminance calculation section, and the LCD data calculation section 514 realizes a display data calculation section. Note that the LED output value calculation section 511 also includes a component for storing predetermined data.

The LED output value calculation section 511 divides an input image $D_{v1}$, which is obtained as a result of regional division by the regional image division section 505, into a plurality of areas, and obtains LED data (emission luminance data) $D_{b1}$, which indicates luminances upon emission of LEDs corresponding to the areas. Note that in the following, values for luminances upon emission of LEDs will be referred to as "LED output values". The luminance spread filter 14 has stored therein PSF data, which is data representing diffusion states of light by numerical values to calculate an actual display luminance for each area, as shown in FIG. 4, for example.

The display luminance calculation section 513 calculates an actual display luminance $D_{b1c}$ for each area on the basis of the LED data $D_{b1}$ obtained by the LED output value calculation section 511 and the PSF data $D_p$ stored in the luminance spread filter 14.

Note that the display luminance is equivalent to the actual brightness of an area illuminated by LED units in that area and its surrounding areas, as mentioned earlier, and a luminance for display obtained in the area is referred to herein as a display luminance.

The image memory 512 functions as a delay section for storing input images $D_{v1}$ (corresponding to the left halves of input images $D_v$) for a predetermined number of frames and outputting the input images $D_{v1}$ in order from earlier storage with delays of a predetermined number of frames therebetween. By such delays of a predetermined number of frames, they can be provided to the LCD data calculation section 514 in synchronized timing with (in correct correspondence with), particularly, display luminances $D_{b1c}$ outputted by the display luminance calculation section 513 with delays (due to time-consuming computations). Note that in the case where arithmetic operations can be performed at a sufficiently high speed to accommodate the delays, the image memory 512 can be omitted.

On the basis of an input image $D_{v1m}$ outputted by the image memory 512, and the display luminance $D_{b1c}$ obtained for each area by the display luminance calculation section 513, the LCD data calculation section 514 obtains liquid crystal data $D_{a1}$ representing light transmittances of all display elements P provided in the liquid crystal panel 7. The calculation method will be described later.

Note that the second region-processing section 520 includes the same components as those provided in the first region-processing section 510, and operates in the same manner as the first region-processing section 510, except that input images $D_{v2}$ are provided as image data, and liquid crystal data $D_{a2}$ and LED data $D_{b2}$ are outputted, and therefore any descriptions thereof will be omitted herein.

The area-active drive processing section 5 calculates and outputs the liquid crystal data $D_{a1}$ and $D_{a2}$ and the LED data $D_{b1}$ and $D_{b2}$, as described above, and this process will be described in further detail below with reference to FIG. 6.

<1.4 Process by the Area-active Drive Processing Section>

Figure 6:
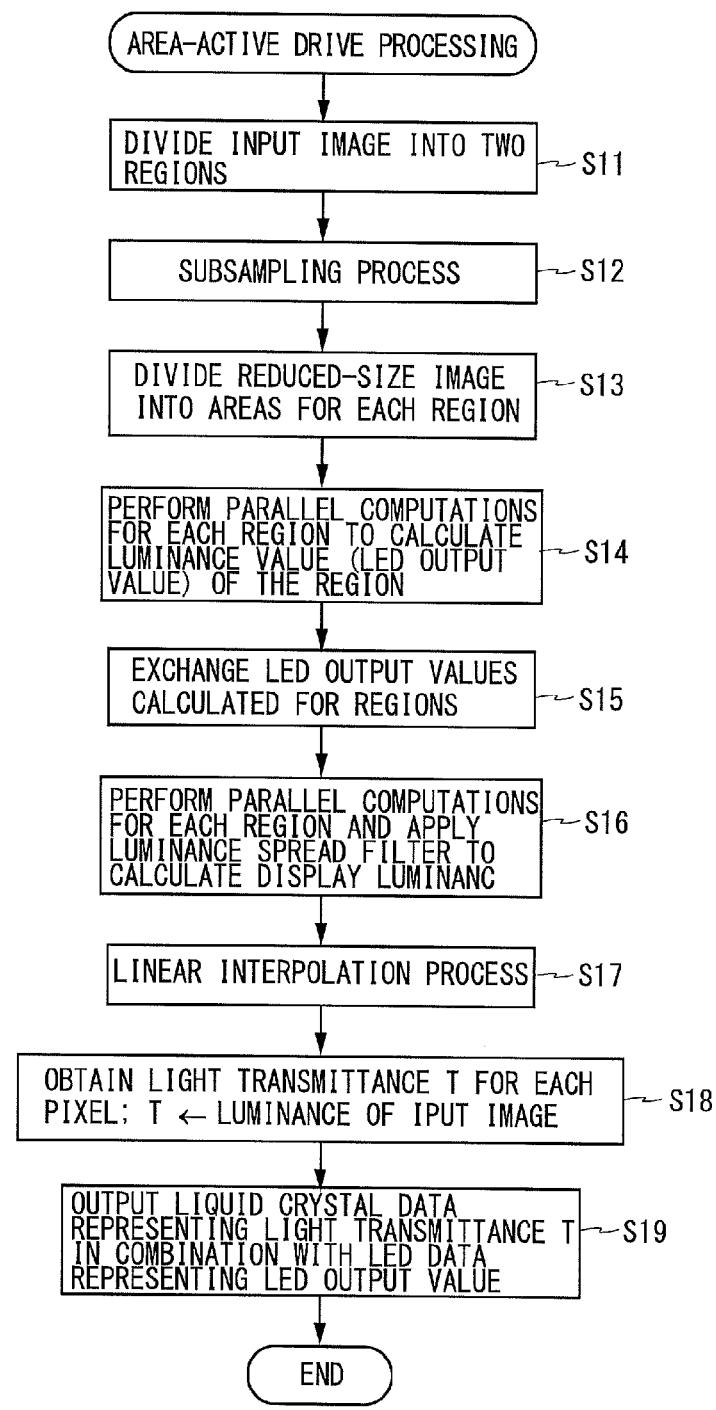
FIG. 6 is a flowchart showing a process by the area-active drive processing section in the embodiment.

FIG. 6 is a flowchart showing the flow of a process by the area-active drive processing section 5. The area-active drive processing section 5 receives an image for a color component (hereinafter, referred to as color component C) included in an input image $D_v$. The area-active drive processing section 5 (the regional image division section 505 provided therein) divides the input image $D_v$ for color component C into left and right halves, thereby generating the left half of the input image for color component C (simply referred to below as "input image") $D_{v1}$ and the right half of the input image for color component C (simply referred to below as "input image") $D_{v2}$ (step S11). Note that each of these divided input images for color component C includes luminances for (m/2×n) pixels.

Next, the area-active drive processing section 5 performs a subsampling process (averaging process) on the input images $D_{v1}$ and $D_{v2}$ for color component C, and obtains two corresponding reduced-size images each including luminances for $(s_i/2 \times s_j)$ (where s is an integer of 2 or more) pixels (step S12). In step S12, the images $D_{v1}$ and $D_{v2}$ for color component C are reduced to $s_i/m$ in the horizontal direction and $s_j/n$ in the vertical direction. Then, the area-active drive processing section 5 divides each of the reduced-size images into (i/2×j) areas (step S13). Each area includes luminances for (s×s) pixels.

Next, the area-active drive processing section 5 obtains an LED output value (a luminance value upon LED emission) for each of the (i/2×j) areas in each of the input images $D_{v1}$ and $D_{v2}$ (step S14). Conventionally known methods for determining the LED output value include, for example, a method in which a determination is made on the basis of a maximum luminance value $M_a$ among pixels in the area, a method in which a determination is made on the basis of a mean luminance value $M_e$ among the pixels in the area, and a method in which a determination is made on the basis of a value obtained by weighted averaging of the maximum luminance value $M_a$ and the mean luminance value $M_e$ among the pixels in the area. Note that the processing from steps S11 to S14 is performed in parallel by the LED output value calculation sections 511 respectively provided in the first and second region-processing sections 510 and 520 within the area-active drive processing section 5.

Subsequently, the area-active drive processing section 5 causes the first and second region-processing sections 510 and 520 to exchange LED output values $D_{b1}$ and $D_{b2}$ calculated in parallel therebetween (step S15). Specifically, the LED output value $D_{b1}$ calculated by the first region-processing section 510 is provided to the second region-processing section 520, and the LED output value $D_{b2}$ calculated by the second region-processing section 520 is provided to the first region-processing section 510.

Next, the area-active drive processing section 5 applies the luminance spread filter (dot-spread filter) 14 to each of the (i/2×j) LED output values obtained in step S15, thereby obtaining first backlight luminance data including $(t_i/2 \times t_j)$ (where t is an integer of 2 or more) display luminances (step S16). In step S16, the (i/2×j) LED output values are increased to t-fold both in the horizontal and the vertical direction, thereby obtaining $(t_i/2 \times t_j)$ display luminances. Note that the processing of step S16 is performed by the display luminance calculation section 513 within the area-active drive processing section 5.

Subsequently, the area-active drive processing section 5 performs a linear interpolation process on the first backlight luminance data, thereby obtaining second backlight luminance data including (m/2×n) luminances (step S17). In step S17, the first backlight luminance data is increased to $(m/2/t_i)$-fold in the horizontal direction and $(n/2/t_j)$-fold in the vertical direction. The second backlight luminance data represents luminances of backlight for color component C which is incident on (m/2×n) display elements P for color component C where (i/2×j) LEDs for color component C emit light with the luminances obtained in step S15.

Next, the area-active drive processing section 5 performs comparative computations, such as division of the luminances of the (m/2×n) pixels included in the input image for color component C respectively by the (m/2×n) luminances included in the second backlight luminance data, thereby obtaining light transmittances T of the (m/2×n) display elements P for color component C (step S18). Note that the processing of steps S16 to S18 is performed by the LCD data calculation sections 514 respectively provided in the first and second region-processing sections 510 and 520 within the area-active drive processing section 5.

Finally, for color component C, the area-active drive processing section 5 combines liquid crystal data $D_{a1}$ and $D_{a2}$, each representing the (m/2×n) light transmittances obtained in step S18, and also combines LED data $D_{b1}$ and $D_{b2}$, each representing the (i/2×j) LED output values obtained in step S15, before outputting liquid crystal data $D_a$ and LED data $D_b$ respectively representing the (m×n) light transmittances and (i×j) LED output values (step S19). Note that the processing of step S19 is performed by the LCD data combining section 540 and the LED output value combining section 530 within the area-active drive processing section 5.

The area-active drive processing section 5 performs the process shown in FIG. 6 on an R image, a G image, and a B image, thereby obtaining liquid crystal data $D_a$ representing (m×n×3) light transmittances and LED data $D_b$ representing (i×j×3) LED output values, on the basis of an input image $D_v$ including luminances of (m×n×3) pixels.

Figure 7:
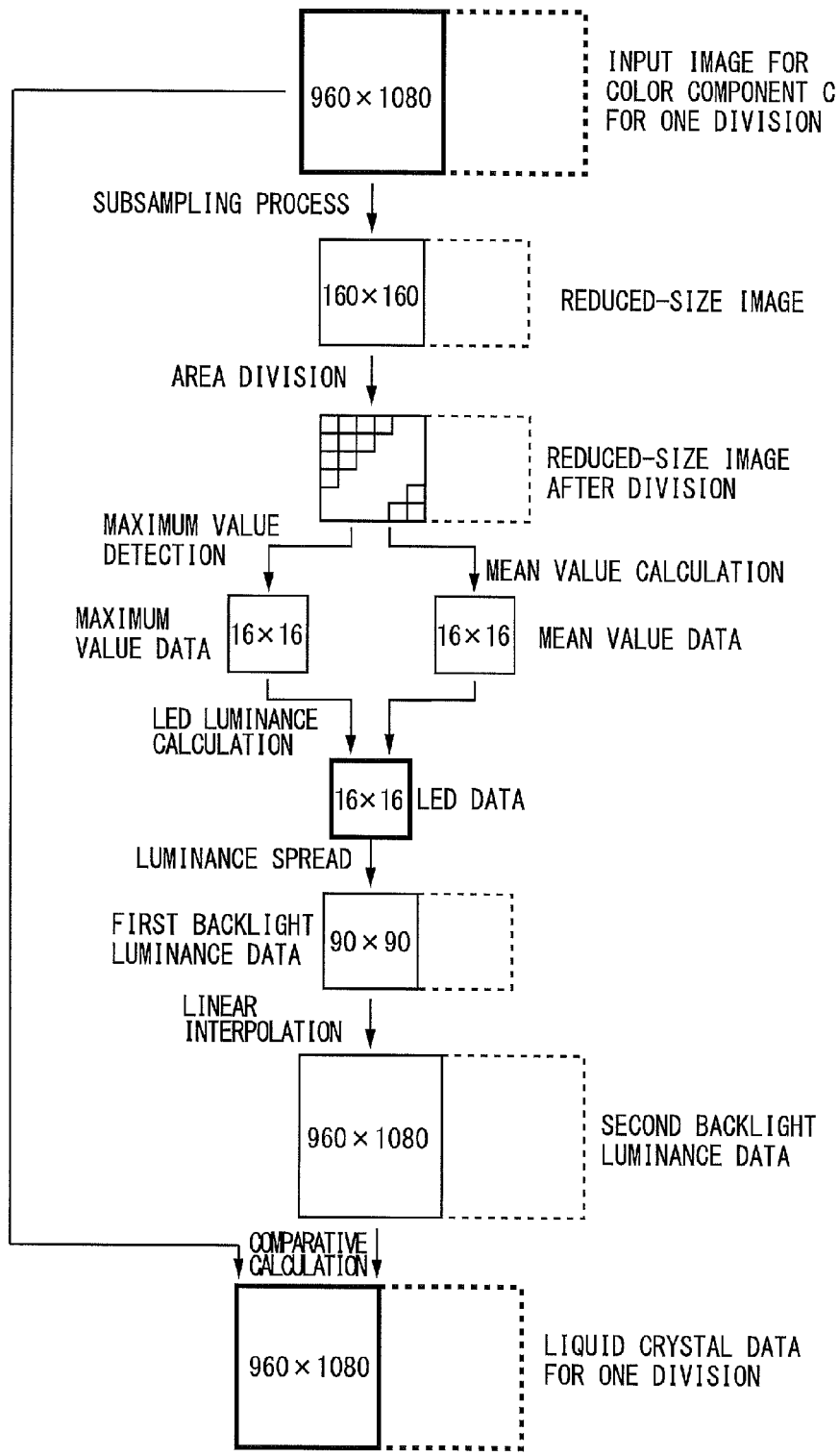
FIG. 7 is a diagram showing the course of action up to obtaining liquid crystal data and LED data in the embodiment.

FIG. 7 is a diagram showing the course of action up to obtaining liquid crystal data and LED data where m=1920, n=1080, i=32, j=16, s=10, and t=5. As shown in FIG. 7, a subsampling process is performed on input images $D_{v1}$ and $D_{v2}$ for color component C, each of which includes luminances of (1920×1080) pixels, thereby obtaining reduced-size images, each including luminances of (160×160) pixels. Each of the reduced-size images is divided into (16×16) areas (the size of each area is (10×10) pixels). For each area, the maximum value $M_a$ and the mean value $M_e$ for the pixel luminances are calculated, thereby obtaining maximum value data including (16×16) maximum values and mean value data including (16×16) mean values. Then, LED data for color component C, representing (16×16) LED luminances (LED output values), is obtained on the basis of the maximum value data, the mean value data, or a weighted average of the maximum value data and the mean value data.

By applying the luminance spread filter 14 to the LED data for color component C, first backlight luminance data, including (90×90) display luminances, is obtained. By performing a linear interpolation process on the first backlight luminance data, second backlight luminance data, including (960×1080) display luminances, is obtained. Finally, liquid crystal data for color component C, including (960×1080) light transmittances, is obtained by comparative calculations, such as division of the pixel luminances included in the input image by the display luminances included in the second backlight luminance data.

Note that in FIG. 6, for ease of explanation, the area-active drive processing section 5 sequentially performs the process on images for color components, but the process may be performed on the images for color components in a time-division manner or such a process may be performed in parallel for each color. Alternatively, the backlight luminance may be simply set in accordance with the (integrated) luminance for all color components of an input image. Moreover, in FIG. 6, the area-active drive processing section 5 performs a subsampling process on an input image for noise removal and performs area-active drive on the basis of reduced-size images, but the area active drive may be performed on the basis of the original input image.

<1.5 Effect>

In this manner, when the first and second region-processing sections 510 and 520 calculate in parallel backlight luminances required for an input image halved by the regional image division section 505, LED data $D_{b1}$ and $D_{b2}$ are exchanged for each other, allowing reference to backlight luminances not calculated for one region but calculated for the other region. As a result, when an area is illuminated by surrounding backlight sources, the actual display luminance can be calculated correctly. Thus, pixel display can be provided with correct display tones across the entire screen, thereby preventing a reduction in display quality. This effect will be described in further detail with reference to FIGS. 8 to 12.

Figure 8:
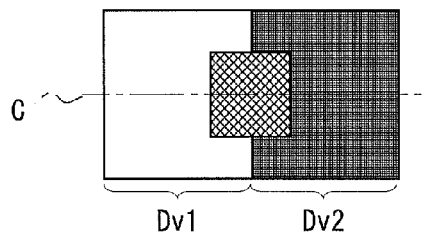
FIG. 8 is a diagram illustrating an example of an image provided in the embodiment.
Figure 9:
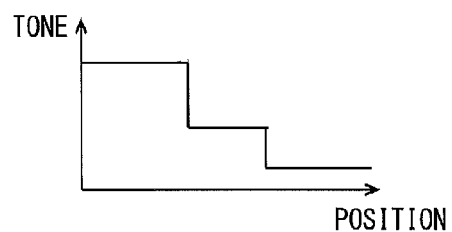
FIG. 9 is a graph showing the relationship between the pixel tone and the pixel position along a center line in the embodiment.

FIG. 8 is a diagram illustrating an example of an image provided to the present liquid crystal display device, and FIG. 9 is a graph showing the relationship between the pixel tone and the pixel position along the center line shown in FIG. 8. In the input image $D_v$ shown in FIG. 8, the left half is a generally high-tone (bright) region, the right half is a generally low-tone (dark) region, and a half-tone rectangular region is further included at a central part of the image. Accordingly, as shown in FIG. 9, the pixel tone along center line C by which the image is vertically halved takes a high value in the range from the left edge to around the center of the image, an intermediate value at the center, and a low value in the range from around the center to the right edge. The input image $D_v$ is divided into input images $D_{v1}$ and $D_{v2}$ by the regional image division section 505, as shown in the figure.

One of the divisions, the input image $D_{v1}$, is provided to the first region-processing section 510, and the other division, the input image $D_{v2}$, is provided to the second region-processing section 520, so that their corresponding backlight luminance data, LED data $D_{b1}$ and $D_{b2}$, are calculated, as described earlier. The LED data $D_{b1}$ ad $D_{b2}$ are provided to the backlight driver circuit 4, causing the LED units 32 provided in the backlight 3 to be lit up with predetermined luminances.

Figure 10:
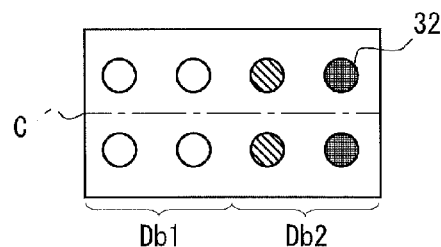
FIG. 10 is a diagram schematically illustrating lighting-up luminances of LED units for displaying the image shown in FIG. 8.

FIG. 10 is a diagram schematically illustrating lighting-up luminances of LED units for displaying the image shown in FIG. 8. Note that for ease of explanation, in FIG. 10, the backlight 3 is assumed to consist of eight LED units 32 as represented by circles. In addition, white circles represent LED units 32 with high (bright)) luminance values, black circles represent LED units 32 with low (dark) luminance values, and hatched circles represent LED units 32 with intermediate luminance values.

As shown in FIG. 9, corresponding backlights are lit up with a high luminance (e.g., at the maximum luminance value 255) to display the input image $D_{v1}$, and with an intermediate (e.g., at the intermediate luminance value 127) or low (e.g., at the minimum luminance value 0) luminance to display the input image $D_{v2}$. Note that when the minimum luminance value 0 is set, the backlights are turned off, but for convenience of explanation, such a case is described by being lit up at a luminance value of 0.

Furthermore, the LED data $D_{b1}$ and $D_{b2}$ for lighting up the backlights as described above are exchanged between the first and second region-processing sections 510 and 520, so that, on the basis of the LED data $D_{b1}$ and $D_{b2}$, the display luminance calculation section 513 provided in the first region-processing section 510 calculates the actual display luminance $D_{b1c}$, and the display luminance calculation section 513 (not shown but similarly) provided in the second region-processing section 520 calculates the actual display luminance $D_{b2c}$.

Figure 11:
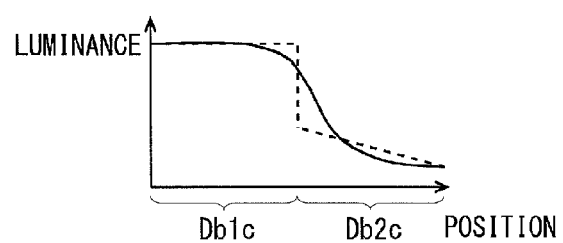
FIG. 11 is a graph showing a distribution of actual display luminances among the LED units shown in FIG. 10.

FIG. 11 is a graph showing a distribution of actual display luminances among the LED units shown in FIG. 10. The horizontal axis shown in FIG. 11 represents pixel positions along center line C, and the vertical axis represents display luminances at corresponding positions. Moreover, the solid line in the figure represents the display luminances $D_{b1c}$ and $D_{b2c}$ calculated by the display luminance calculation sections 513 and the dotted line in the figure represents the display luminances $D_{b1c}$ and $D_{b2c}$ independently calculated by display luminance calculation sections that do not exchange LED data $D_{b1}$ and $D_{b2}$ therebetween (i.e., the present invention is not applied).

Specifically, in the present embodiment, both of the LED data $D_{b1}$ and $D_{b2}$ are referenced at the time of display luminance calculation, and therefore around the boundary between the regions corresponding to the input images $D_{v1}$ and $D_{v2}$, respectively, the luminances of adjacent or nearby LED units in the other region that affect each other are taken into consideration. Accordingly, as indicated by the solid line in FIG. 11, the display luminance distribution correspondingly (gently) changes in accordance with pixel position changes. Note that the display luminance distribution thus calculated approximately coincides with the actual luminance distribution if calculation accuracy is high. For convenience of explanation, calculations performed here are assumed to be ideal so that the display luminance distribution shown in FIG. 11 is equal to the actual luminance distribution.

However, in the configuration to which the present invention is not applied, only a corresponding one of the LED data $D_{b1}$ and $D_{b2}$ is referenced, and therefore around the boundary between the regions corresponding to the input images $D_{v1}$ and $D_{v2}$, respectively, the luminances of adjacent or nearby LED units in the other region that affect each other are not taken into consideration. Accordingly, as indicated by the dotted line in FIG. 11, the display luminance distribution (sharply) changes around the boundary between the regions, not in accordance with pixel position changes. In the configuration to which the present invention is not applied, pixel tone values (liquid crystal data) are calculated (by a calculation section corresponding to the LCD data calculation section 514) premising such display luminances different from the actual luminances, and therefore an image actually displayed differs from the input image $D_v$. This will be described with reference to FIGS. 12 and 13.

Figure 12:
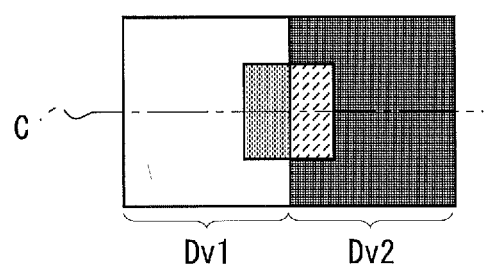
FIG. 12 is a diagram illustrating exemplary image display where the present invention is not applied.
Figure 13:
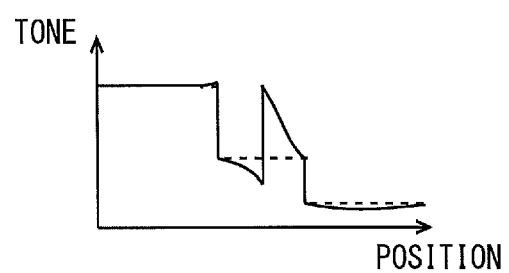
FIG. 13 is a graph showing the relationship between the pixel tone and the pixel position along center line C shown in FIG. 12.

FIG. 12 is a diagram illustrating exemplary image display where the present invention is not applied, and FIG. 13 is a graph showing the relationship between the pixel tone and the pixel position along center line C shown in FIG. 12. The display image shown in FIG. 12 is the same as the input image Dv shown in FIG. 8 in that the left half is a generally high-tone (bright) region and the right half is a generally low-tone (dark) region, but the half-tone rectangular region displayed around the center of the image significantly differs from FIG. 8 in terms of the tone, resulting in an abnormal display state. Specifically, at the position corresponding to the half-tone rectangular region, which is indicated by the solid line in FIG. 13, the tone value where the present invention is not applied significantly deviates from the tone value in the present embodiment (shown in FIG. 9), which is indicated by the dotted line in FIG. 13. Such a deviation becomes greater particularly around the boundary between the input images $D_{v1}$ and $D_{v2}$.

In this manner, in the present embodiment, the LED data $D_{b1}$ and $D_{b2}$ are exchanged between the first and second region-processing sections 510 and 520, so that the display luminances can be correctly calculated, resulting in no tone deviation such as that shown in FIG. 13, and no abnormal display such as that shown in FIG. 12. Thus, pixel display can be provided with correct display tones across the entire screen, thereby preventing a reduction in display quality.

<2. Second Embodiment>
<2.1 Overall Configuration and Operation>

The configuration and the operation of a liquid crystal display device 2 according to a second embodiment of the present invention are almost the same as those of the liquid crystal display device 2 according to the first embodiment shown in FIG. 1, except that the configuration and the operation of the area-active drive processing section 5 in the present embodiment slightly differ in detail from those in the first embodiment.

Figure 14:
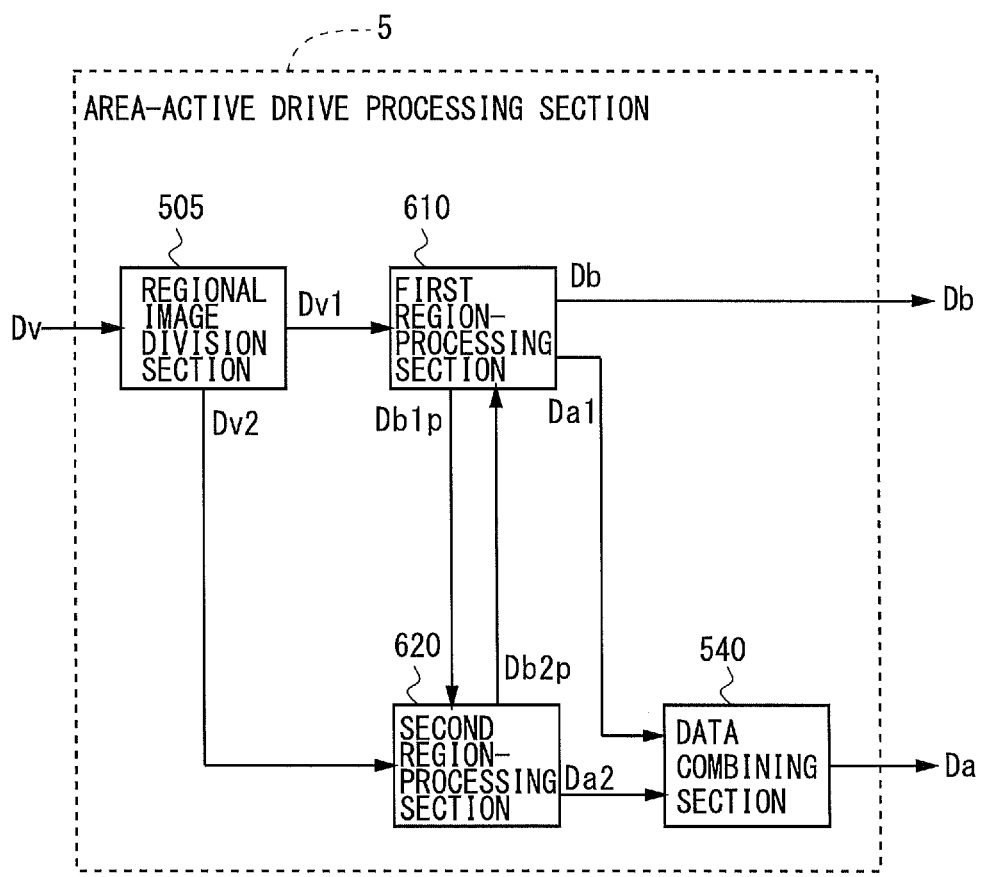
FIG. 14 is a block diagram illustrating in detail the configuration of an area-active drive processing section in a second embodiment of the present invention.

FIG. 14 is a block diagram illustrating in detail the configuration of the area-active drive processing section 5 in the present embodiment. In addition to the same regional image division section 505 and LCD data combining section 540 as in the first embodiment shown in FIG. 3, the area-active drive processing section 5 shown in FIG. 14 includes first and second region-processing sections 610 and 620, which do not exchange LED data $D_{b1}$ and $D_{b2}$ but pre-correction LED data $D_{b1p}$ and $D_{b2p}$ including LED data portions that correspond to an overlapping region to be described later. The reason for not exchanging LED data $D_{b1}$ and $D_{b2}$ is that LED data $D_{b1}$ and $D_{b2}$ are corrected on the basis of exchanged data, such that the overlapping region does not have insufficient backlight luminance.

Note that since the configuration of the backlight 3 in the liquid crystal display device 2 according to the second embodiment of the present invention is the same as in the first embodiment shown in FIG. 2, and the overall process by the area-active drive processing section 5 is almost the same as in the first embodiment shown in FIG. 6, the same components (and process steps) are denoted by the same characters, and any descriptions thereof will be omitted. Hereinafter, referring to FIG. 15, the configuration of the first region-processing section 610 in the present embodiment will be described in detail. Note that the second region-processing section 620 is configured in the same manner as the first region-processing section 610, and therefore any description thereof will be omitted, except that it does not output LED data $D_b$ as will be described later.

<2.2 Configuration of the First Area Processing Section>

Figure 15:
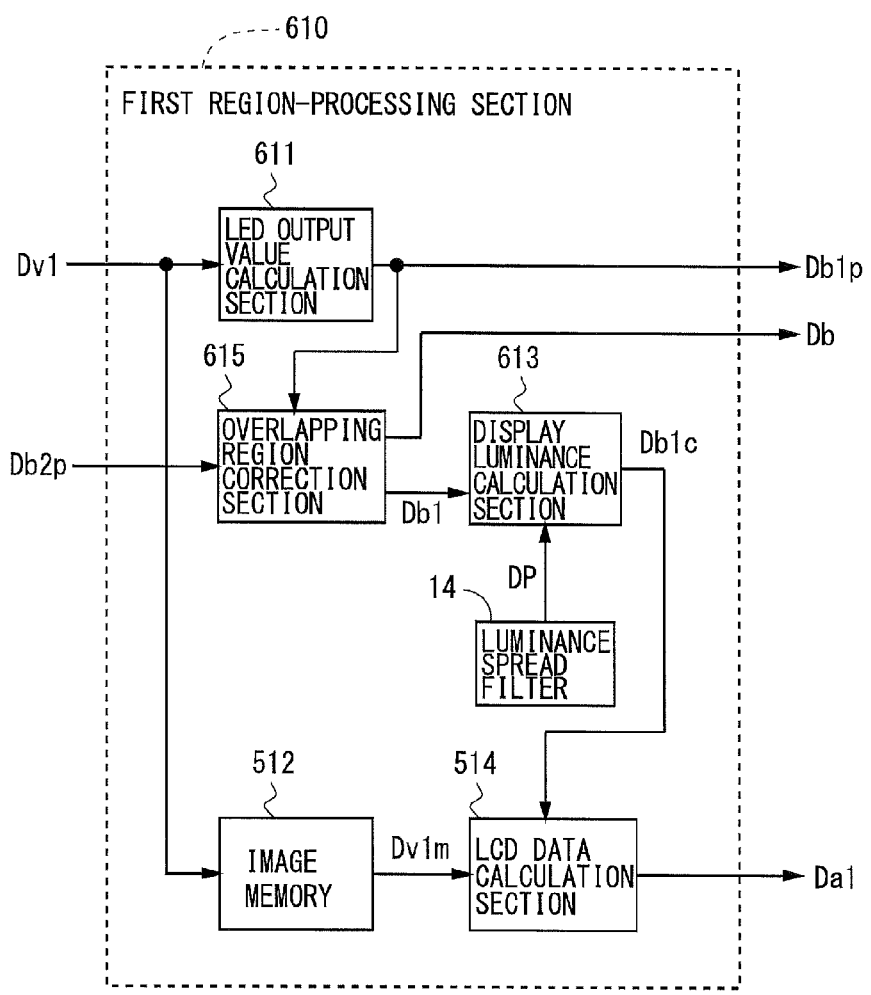
FIG. 15 is a block diagram illustrating in detail the configuration of a first region-processing section in the embodiment.

FIG. 15 is a block diagram illustrating in detail the configuration of the first region-processing section in the present embodiment. The first region-processing section 610 includes the image memory 512, LCD data calculation section 514, and luminance spread filter 14 as in the first embodiment, and also includes an LED output value calculation section 611 and a display luminance calculation section 613, which are different from those in the first embodiment. In the following, the same components are denoted by the same characters, so any descriptions thereof will be omitted, and the operation of the different components will be described in detail.

The LED output value calculation section 611 obtains LED data (emission luminance data) corresponding to the areas that are set in an input image $D_{v1}$, as in the first embodiment, and also obtains LED data corresponding to any area that is set in an input image $D_{v2}$ and is adjacent to (or near) any of the areas that are set in the input image $D_{v1}$ (hereinafter, referred to as an "adjacent area"), and these data are outputted as pre-correction LED data $D_{b1p}$. The pre-correction LED data $D_{b1p}$ is provided to the second region-processing section 620.

An overlapping region correction section 615 receives the pre-correction LED data $D_{b1p}$ from the LED output value calculation section 611 and the pre-correction LED data $D_{b2p}$ from the second region-processing section 620, and obtains LED data corresponding to their respective adjacent areas, which are overlapping regions, in the input images $D_{v1}$ and $D_{v2}$, by a method to be described later. The obtained LED data corresponding to the overlapping regions and the LED data corresponding to the other regions in the input image $D_{v1}$ and obtained by the same method as in the first embodiment are outputted as LED data $D_{b1}$. Moreover, the LED data corresponding to all of the input images $D_{v1}$ and $D_{v2}$, including the overlapping regions, (i.e., the input image $D_v$) is outputted as LED data $D_b$. Note that the LED data $D_b$ can be outputted by the second region-processing section 620 (the overlapping region correction section provided therein) as well, but since the same LED data $D_b$ can be obtained by the first and second region-processing sections 610 and 620, it is only necessary to output LED data $D_b$ obtained by one of them, and therefore the first region-processing section 610 outputs LED data $D_b$.

The display luminance calculation section 613 calculates the actual display luminance $D_{b1c}$ for each area on the basis of the LED data $D_{b1}$ obtained by the overlapping region correction section 615 and the PSF data $D_p$ stored in the luminance spread filter 14. However, unlike in the first embodiment, the LED data $D_{b1}$ does not include all LED data corresponding to the input image $D_{v2}$, and merely includes LED data corresponding to adjacent areas in the input image $D_{v1}$, but there are no differences in calculations so long as the ranges of luminance spread defined by the PSF data $D_p$ match the ranges of the adjacent areas. Note that the overlapping region correction section 615b may be configured to output only the LED data $D_b$ without outputting the LED data $D_{b1}$, but in such a case, it is preferable for the display luminance calculation section 613 to use only the portion that corresponds to LED data $D_{b1}$ in display luminance calculations in order not to take much time for the display luminance calculations. Note that in the case where the display luminance calculation section 613 needs all LED data, LED data $D_b$ and LED data $D_{b1}$ can be unified. Next, a method for the LED output value calculation section 611 to calculate LED data and a method for the overlapping region correction section 615 to calculate LED data corresponding to overlapping regions will be described with reference to FIGS. 16 to 21.

<2.3 Operation for Calculating LED Data>

Figure 16:
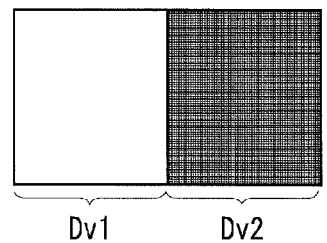
FIG. 16 is a diagram illustrating an example of an image provided in the embodiment.

FIG. 16 is a diagram illustrating an example of an input image to be provided in the present embodiment. In the input image $D_v$ shown in FIG. 16, the left half is a high-tone (bright) region and the right half is a low-tone (dark) region. On the basis of this input image example, the method for the LED output value calculation section 611 to calculate LED data will be described first.

Figure 17:
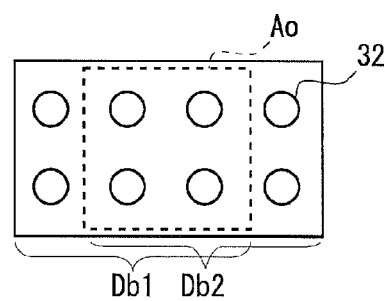
FIG. 17 is a diagram illustrating the correspondence between LED data and LED units in the embodiment.

FIG. 17 is a diagram illustrating the correspondence between the LED data $D_{b1}$ and $D_{b2}$ and LED units which are arranged in the same manner as in the case shown in FIG. 10. As shown in FIG. 17, the LED data $D_{b1}$ corresponds to four LED units in the left half and also two LED units adjacent thereto, and the LED data $D_{b2}$ corresponds to four LED units in the right half and also two LED units adjacent thereto, so that these data overlap with respect to four LED units within overlapping region $A_o$ indicated by dotted lines in the figures. Note that these overlapping data portions have the same contents both in the LED data $D_{b1}$ and $D_{b2}$, as will be described later, and the first region-processing section 610 outputs LED data $D_b$ including the overlapping portion to be provided to the backlight driver circuit 4, as described above.

Figure 18:
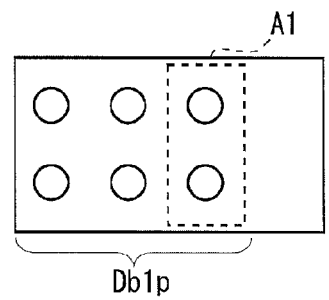
FIG. 18 is a diagram schematically illustrating lighting-up luminances specified by pre-correction LED data $D_{b1p}$ in the embodiment.
Figure 19:
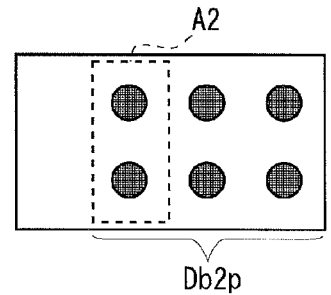
FIG. 19 is a diagram schematically illustrating lighting-up luminances specified by pre-correction LED data $D_{b2p}$ in the embodiment.

FIG. 18 is a diagram schematically illustrating lighting-up luminances specified by pre-correction LED data $D_{b1p}$ for displaying the image shown in FIG. 16, and FIG. 19 is a diagram schematically illustrating lighting-up luminances specified by pre-correction LED data $D_{b2p}$ for displaying the image shown in FIG. 16. Here, as in FIG. 10, white circles represent high (bright) luminance values, and black circles represent low (dark) luminance values.

Here, as will be appreciated with reference to FIG. 18, the portion of the pre-correction LED data $D_{b1p}$ that is set for the four LED units in the left half corresponding to the input image $D_{v1}$ is at a high luminance value (e.g., the maximum luminance value 255) to illuminate high-tone pixels brightly. Note that the pre-correction LED data $D_{b1p}$ is not actually set for the LED units, and post-correction LED data $D_b$ to be described later is set.

Furthermore, the portion of the pre-correction LED data $D_{b1p}$ that is set for the two LED units corresponding to an area included in the input image $D_{v2}$ and being adjacent to the input image $D_{v1}$ (adjacent area $A_1$ indicated by dotted lines in the figure) is at a value determined with reference to a value to be set for each adjacent LED unit to adjacent area $A_1$. Concretely, the luminance value of an LED unit included in adjacent area $A_1$ is set at the maximum among the luminance values to be set for its surrounding LEDs. Accordingly, in the above example, as shown in FIG. 18, a high luminance value (e.g., the maximum luminance value 255) is set for all LED units included in adjacent area $A_1$ (indicated as white circles in the figure).

Furthermore, the pre-correction LED data $D_{b2p}$ is set in the same manner as the pre-correction LED data $D_{b1p}$ and, as shown in FIG. 19, the portions to be set for the LED units that correspond to the input image $D_{v2}$ and the LED units that correspond to adjacent area $A_2$ included in the input image $D_{v1}$ and being indicated by dotted lines in the figure are at a low luminance value (e.g., the minimum luminance value 0).

The overlapping region correction section 615 calculates LED data $D_b$ and LED data $D_{b1}$ on the basis of the pre-correction LED data $D_{b1p}$ thus calculated by the LED output value calculation section 611 and the pre-correction LED data $D_{b2p}$ similarly calculated by the second region-processing section 620 (the LED output value calculation section therein). Concretely, for the portion of the LED data $D_{b1}$ (shown in FIG. 17) that corresponds to the input image $D_{v1}$, excluding overlapping region $A_o$, the value of the pre-correction LED data $D_{b1}$ is selected without modification, and for the portion of the LED data $D_{b1}$ that corresponds to overlapping region $A_o$, the larger (the maximum) of the pre-correction LED data $D_{b1p}$ and $D_{b2p}$ is selected, so that these selected values are outputted as LED data $D_{b1}$. In this manner, by selecting the larger luminance value in the overlapping region, it is rendered possible to inhibit occurrence of insufficient backlight luminance in the overlapping region, which is prone to insufficient backlight luminance. Moreover, the LED data $D_{b1}$ with addition of data corresponding to the input image $D_{v2}$, excluding overlapping region $A_o$, is outputted as LED data $D_b$ corresponding to all of the input images $D_{v1}$ and $D_{v2}$ (i.e., the input image $D_v$). In addition, the overlapping region correction section provided in the second region-processing section 620 outputs LED data $D_{b2}$ in a similar manner to the above, but LED data $D_b$ of the same contents is not outputted.

Figure 20:
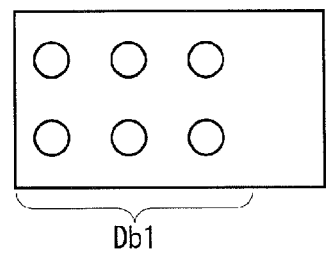
FIG. 20 is a diagram schematically illustrating lighting-up luminances specified by LED data $D_{b1}$ in the embodiment.
Figure 21:
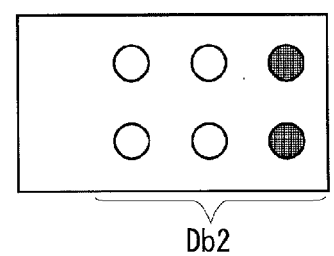
FIG. 21 is a diagram schematically illustrating lighting-up luminances specified by LED data $D_{b2}$ in the embodiment.

FIG. 20 is a diagram schematically illustrating lighting-up luminances specified by the LED data $D_{b1}$ thus calculated, and FIG. 21 is a diagram schematically illustrating lighting-up luminances specified by the LED data $D_{b2}$. As can be appreciated with reference to FIGS. 18 and 19 for comparison, the maximum value in an overlapping region corresponding to overlapping region $A_o$ shown in FIG. 17 is the value corresponding to a white circle (e.g., the maximum luminance value 255). Accordingly, in FIGS. 20 and 21 also, LED units corresponding to the region are represented by white circles (e.g., at the maximum luminance value 255), LED units corresponding to other regions are represented by white circles in FIG. 20, as in FIG. 18, and black circles (e.g., at the minimum luminance value 0) in FIG. 21, as in FIG. 19.

Figure 22:
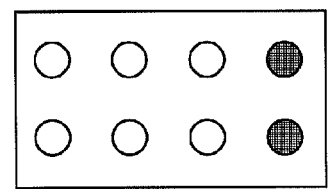
FIG. 22 is a diagram illustrating a backlight illumination state in the embodiment.

The LED data $D_b$ thus calculated by the first region-processing section 610 is provided to the backlight driver circuit 4, so that LED units are lit up with luminances in accordance with the data, as shown in FIG. 22, for example.

FIG. 22 is a diagram illustrating the illumination state of the backlight at the time of the input image shown in FIG. 16 being provided. As can be appreciated with reference to FIGS. 20 to 22, LED data $D_{b1}$ to control corresponding LED units to create the illumination state shown in FIG. 20 and LED data $D_{b2}$ to control corresponding LED units to create the illumination state shown in FIG. 21 are combined so as to delete one of their overlapping regions, thereby obtaining LED data $D_b$ to control corresponding LED units to create the illumination state shown in FIG. 22.

<2.4 Effect>

In this manner, for two input images obtained through division by the regional image division section 505, when the first and second region-processing sections 610 and 620 perform parallel calculations, as in the first embodiment, backlight luminance data for an overlapping region around the boundary between the input images are exchanged, and the larger (the maximum) of the exchanged data is used in order not to cause insufficient luminance in the overlapping region, thereby achieving the effect as achieved by the first embodiment and also inhibiting occurrence of insufficient backlight luminance to which the overlapping region is prone, so that a reduction in display quality can be prevented. This will be described in detail with reference to examples in FIGS. 23 and 24 where the configuration of the present embodiment is not employed.

Figure 23:
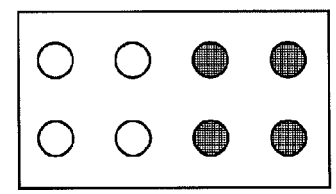
FIG. 23 is a diagram illustrating the backlight illumination state where the configuration of the embodiment is not employed.

FIG. 23 is a diagram illustrating the backlight illumination state where the configuration of the present embodiment is not employed. As described earlier, to exchange backlight luminance data in an overlapping region, the LED output value calculation section 611 provided in the first region-processing section 610 in the present embodiment calculates luminances for an area that corresponds to an input image $D_{v1}$ corresponding to the region and its adjacent area, but in the case where such a configuration of the present embodiment is not employed and parallel calculations are simply performed, only the luminance for the area that corresponds to the corresponding input image $D_{v1}$ is calculated. The same can be said of the LED output value calculation section provided in the second region-processing section 620. The illumination state of LED units corresponding to the resultant LED data $D_b$ is as shown in FIG. 23. However, such an LED unit illumination state might lead to reduced display quality due to insufficient luminance as shown in FIG. 24.

Figure 24:
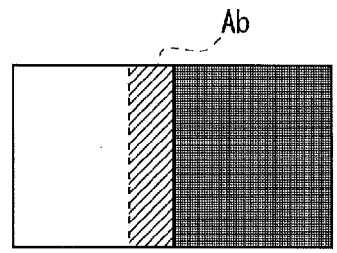
FIG. 24 is a diagram illustrating an example of a display image with insufficient luminance where the configuration of the embodiment is not employed.

FIG. 24 is a diagram illustrating an example of a display image with insufficient luminance where the configuration of the present embodiment is not employed. As an input image corresponding to the display image example shown in FIG. 24, the exemplary image shown in FIG. 16 includes a high-tone (here, maximum-tone) region in the left half and a low-tone (here, minimum-tone) region in the right half. However, as can be appreciated by comparison with FIG. 16, in the example shown in FIG. 24, the tone value for boundary region $A_b$ indicated by oblique lines should be maximum but does not reach its maximum value, resulting in reduced display quality.

Here, in general, to reduce power consumption, it is often the case that, taking advantage of one lit-up LED unit illuminating its surrounding areas, the (maximum) luminance of each LED unit is set such that an image can be displayed with the maximum tone when all LED units are lit up with the maximum luminance (or a predetermined high luminance). In the present embodiment also, the maximum luminance is set in such a manner. In this case, even an LED unit is lit up with the maximum luminance, an area corresponding to that LED unit might have insufficient luminance.

Since the display image example shown in FIG. 24 has a high-tone (here, maximum tone) region in the left half and a low-tone (here, minimum tone) region in the right half, the tone value for boundary region $A_b$ indicated by oblique lines does not reach its maximum value, though it should be maximum. As a result, the luminance of the LED units that correspond to boundary region $A_b$ becomes insufficient, as shown in FIG. 25.

Figure 25:
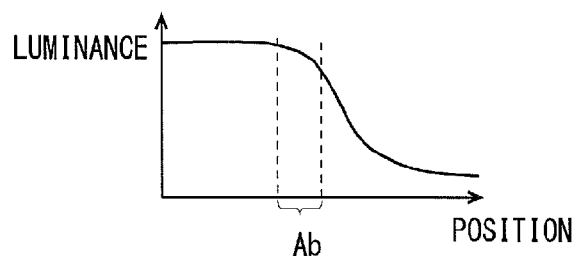
FIG. 25 is a graph showing a distribution of actual display luminances among LED units where the configuration of the embodiment is not employed.

FIG. 25 is a graph showing a distribution of actual display luminances among the LED units shown in FIG. 23 where the configuration of the present embodiment is not employed. The horizontal axis shown in FIG. 25 represents pixel positions along a center line which vertically divides an image, and the vertical axis represents luminances at corresponding positions. Moreover, the solid line in the figure represents pixel positions corresponding to boundary region $A_b$.

Since the four LED units in the left half shown in FIG. 23 are lit up with the maximum luminance, and the four LED units in the right half are lit up with the minimum luminance (i.e., they are off), the value of luminance distribution decreases as the pixel position moves rightward, as shown in FIG. 25. In addition, though boundary region $A_b$ should be illuminated with the maximum luminance, the luminance is lower than its maximum value, resulting in insufficient luminance. On the other hand, the configuration of the present embodiment does not cause insufficient luminance, as shown in FIG. 26.

Figure 26:
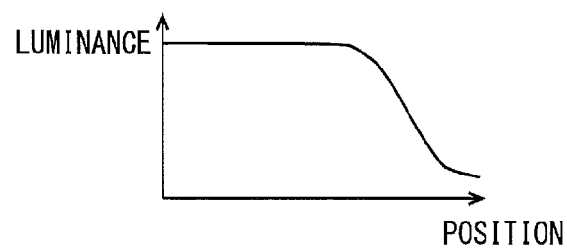
FIG. 26 is a graph showing a distribution of actual luminances among LED units in the embodiment.

FIG. 26 is a graph showing a distribution of actual luminances among the LED units in the present embodiment shown in FIG. 22. Since LED data units in the vicinity of positions corresponding to boundary region $A_b$ are lit up with the maximum luminance as well, as shown in FIG. 22, the luminance for such positions is set at its maximum value, and there is no insufficient luminance. In this manner, by exchanging backlight luminance data for the overlapping region including boundary region $A_b$, and using the larger of the exchanged data in order for the overlapping region not to have insufficient luminance, it is rendered possible to inhibit occurrence of insufficient backlight luminance, and prevent a reduction in display quality. Note that even where there are three or more types of data to be exchanged, the same effect as the above can be achieved by using the maximum value among them.

<3. Third Embodiment>

<3.1 Overall Configuration and Operation>

The configuration and the operation of a liquid crystal display device 2 according to a third embodiment of the present invention are almost the same as those of the liquid crystal display device 2 according to the first embodiment shown in FIG. 1, and the details of the configuration and the operation of the area-active drive processing section 5 and the first region-processing section 610 in the present embodiment are the same as in the second embodiment shown in FIGS. 14 and 15, except for the operation of the overlapping region correction section 615 (and the operation of an unillustrated overlapping region correction section provided in the second region-processing section 620). Accordingly, the same components are denoted by the same characters, and any descriptions thereof will be omitted. The operation of the overlapping region correction section 615 in the present embodiment will be described below with reference to FIG. 27.

<3.2 Operation of the Overlapping Region Correction Portion>

Figure 27:
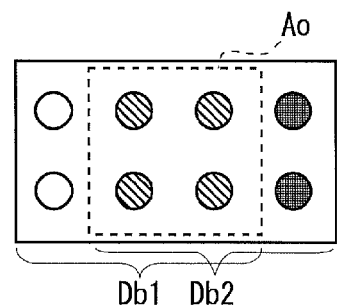
FIG. 27 is a diagram schematically illustrating lighting-up luminances of LED units in a third embodiment of the present invention.

FIG. 27 is a diagram schematically illustrating lighting-up luminances of LED units in the present embodiment for displaying the input image shown in FIG. 16. As can be appreciated by comparing the lighting-up luminances shown in FIG. 27 with the lighting-up luminances specified by the LED data $D_{b1}$ and $D_{b2}$ shown in FIGS. 20 and 21, the overlapping region correction section 615 in the present embodiment operates in the same manner as in the second embodiment in that, for the portion of the LED data $D_{b1}$ that corresponds to the input image $D_{v1}$, excluding overlapping region $A_o$, the value of the pre-correction LED data $D_{b1p}$ is selected without modification, but it differs from the second embodiment in that, for the portion of the LED data $D_{b1}$ that corresponds to overlapping region $A_o$, the larger (the maximum) of the pre-correction LED data $D_{b1p}$ and $D_{b2p}$ is not selected and an intermediate value therebetween is provided. Moreover, the overlapping region correction section provided in the second region-processing section 620 outputs LED data $D_{b2}$ in which an intermediate value is provided for the data portion that corresponds to the overlapping region as in the above. In this manner, by providing an intermediate value, rather than a larger luminance value, for the overlapping region, it is rendered possible to successfully balance the resolution of insufficient backlight luminance to which an overlapping region is prone and the reduction of power consumption.

Specifically, when the values of the pre-correction LED data $D_{b1p}$ and $D_{b2p}$ are $p_1$ and $p_2$ (where $p_1 > p_2$), and a coefficient for calculating an intermediate value $m_1$ is a (where $0 < a < 1$), the intermediate value $m_1$, which is the value of the LED data $D_{b1}$ corresponding to the overlapping region, is obtained by equation (1) below.

$$m_1 = p_1 \times a + p_2 \times (a-1) \tag{1}$$

Note that since a=0 is the same as in the first embodiment when $p_2$ is the minimum luminance value 0, and a=1 is the same as in the second embodiment, these values are considered here out of the range of coefficient a.

In this manner, by setting the value of coefficient a low, power consumption can be significantly reduced as in the first embodiment, and by setting the value of coefficient a high, occurrence of insufficient luminance can be inhibited, so that a reduction in display quality can be reliably prevented. For example, display quality enhancement is prioritized by setting a=0.8, power consumption reduction is prioritized by setting a=0.2, and the effect of moderately enhancing display quality and moderately reducing power consumption can be achieved by setting a=0.5. Note that these values may be constant or may be arbitrarily set by the user.

<3.3 Effect>

In this manner, in the configuration of the present embodiment, backlight luminance data for an overlapping region around a boundary between input images are exchanged as in the second embodiment, and an intermediate value between the minimum and maximum values of the exchanged data is used in order not to cause insufficient luminance in the overlapping region, achieving the same effect as in the first embodiment; as the intermediate value used approaches the maximum value, it is rendered possible to more reliably inhibit occurrence of insufficient backlight luminance to which the overlapping region is prone and prevent a reduction in display quality, and as the intermediate value used approaches the minimum value, it is rendered possible to reduce more power consumption. In addition, the intermediate value can be freely set in accordance with the need for display quality enhancement and power consumption reduction.

<4. Fourth Embodiment>

<4.1 Overall Configuration and Operation>

The configuration and the operation of a liquid crystal display device 2 according to a fourth embodiment of the present invention are the same as in the first through third embodiments in that parallel calculations are performed, but they differ from the configurations and the operations of the liquid crystal display devices 2 according to the embodiments in terms of a parallel processing method in which the screen is not divided into areas but time domains. Here, calculations for even-frame and odd-frame screens are performed in parallel. The configuration and the operation of the area-active drive processing section 5 in which such parallel calculations are performed will be described below with reference to FIG. 28.

<4.2 Configuration of the Area-active Drive Processing Section>

Figure 28:
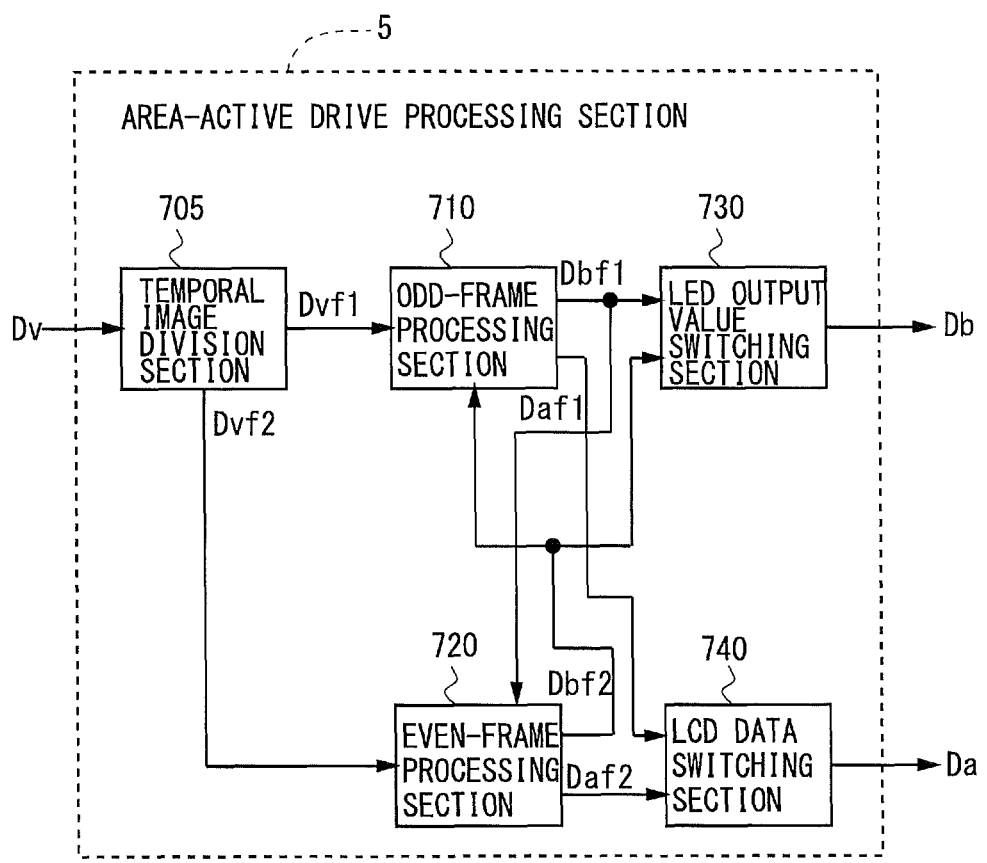
FIG. 28 is a block diagram illustrating in detail the configuration of an area-active drive processing section 5 in a fourth embodiment of the present invention.

FIG. 28 is a block diagram illustrating in detail the configuration of the area-active drive processing section 5 according to the present embodiment. To perform parallel processing on input images being sorted frame by frame (in a time-division manner), the area-active drive processing section 5 shown in FIG. 28 includes a temporal image division section 705, an odd-frame processing section 710, an even-frame processing section 720, an LED output value switching section 730, and an LCD data switching section 740.

As described earlier, area-active drive liquid crystal display devices have screens so large that if the brightness of backlight sources for one screen is calculated per frame period, such calculations might not be completed in time. Particularly in the case of display devices with high frame rates (i.e., one frame period is short), such calculations as above are often not completed within one frame period. Therefore, in the present embodiment, an input image $D_v$ is temporally divided into two input images by the temporal image division section 705 sorting odd frames from even frames, and the odd-frame processing section 710 and the even-frame processing section 720 calculate the brightness of backlight sources in parallel (within two frame periods).

In the parallel calculations, the odd-frame processing section 710 and the even-frame processing section 720 exchange LED data (emission luminance data) $D_{bf1}$ and $D_{bf2}$, which are calculated backlight luminance data, (concretely, the data being alternatingly sent from one side to the other every frame, as will be described later), thereby referencing the backlight luminance for the last frame. As a result, it is possible to prevent the backlight luminance from significantly changing during one frame period. Thus, it is possible to inhibit occurrence of flicker (due to luminance changes) across the entire screen, thereby preventing a reduction in display quality.

Liquid crystal data $D_{af1}$ and $D_{af2}$ are pixel values calculated by the odd-frame processing section 710 and the even-frame processing section 720, and the LCD data switching section 740 alternatingly accepts the data every frame and provides them to the panel driver circuit 6 as one consecutive piece of liquid crystal data $D_a$. Moreover, similarly, the LED output value switching section 730 alternatingly accepts the calculated LED data $D_{bf1}$ and $D_{bf2}$ every frame, and provides them to the backlight driver circuit 4 as one consecutive piece of LED data $D_b$. The configuration of the odd-frame processing section 710 will be described in detail below with reference to FIG. 29. Note that the configuration of the even-frame processing section 720 is the same in detail, and therefore any description thereof will be omitted.

<4.3 Configuration of the Odd-frame Processing Section>

Figure 29:
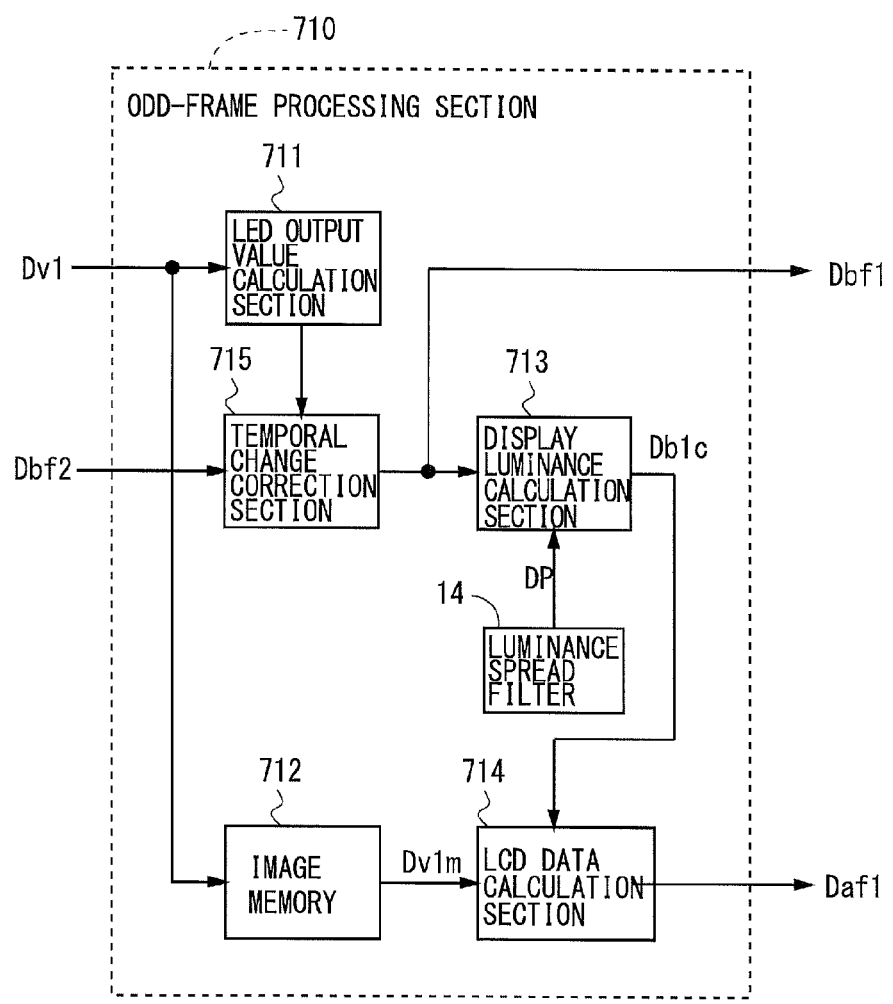
FIG. 29 is a block diagram illustrating in detail the configuration of an odd-frame processing section in the embodiment.

FIG. 29 is a block diagram illustrating in detail the configuration of the odd-frame processing section. The odd-frame processing section 710 includes image memory 712 having the same function as that in the first embodiment, except that image data for one frame is stored, an LCD data calculation section 714 having the same function as that in the first embodiment, except that liquid crystal data for one frame is calculated, an LED output value calculation section 711 having the same function as that in the first embodiment, except that LED data for one frame is calculated, and the same luminance spread filter 14 as in the first embodiment, and the odd-frame processing section 710 further includes a temporal change correction section 715. In the following, any detailed descriptions of components similar to those in the first embodiment will be omitted, and the operation of the temporal change correction section 715, which is a feature component, will be described in detail.

The temporal change correction section 715 receives (pre-correction) LED data for an odd frame, which is calculated by the LED output value calculation section 711 on the basis of an input image $D_{v1}$, and also receives (post-correction) LED data $D_{bf2}$ for the immediately previous frame, which is an even frame, from the even-frame processing section 720, and among the luminance values being set for the areas of that immediately previous frame, any luminance value whose amount of change is equal to or greater than a predetermined threshold is corrected such that the amount of change is less than the threshold, and (post-correction) LED data $D_{bf1}$ is outputted, as will be described later.

The display luminance calculation section 713 calculates an actual display luminance $D_{b1c}$ for each area on the basis of the LED data $D_{bf1}$, and the LCD data calculation section 714 calculates liquid crystal data $D_{af1}$ on the basis of the display luminance $D_{b1c}$. A method for correcting LED data by the temporal change correction section 715 will be described next with reference to FIGS. 30 to 33.

<4.4 Operation for Correcting LED Data>

Figure 30:
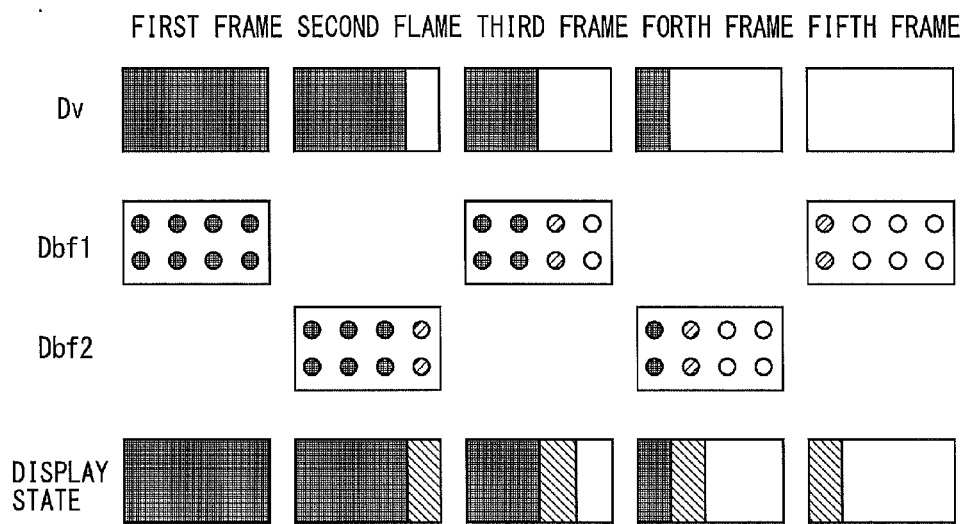
FIG. 30 is a diagram illustrating an example of a frame-by-frame change of an input image, an LED unit illumination state, and a liquid crystal panel display state in the embodiment.

FIG. 30 is a diagram illustrating an example of a frame-by-frame change of an input image, an LED unit illumination state, and a liquid crystal panel display state. Eight LED units arranged in two rows by four columns shown in FIG. 30 are lit up in accordance with LED data $D_{bf1}$ in odd frames and LED data $D_{bf2}$ in even frames. Note that circles representing illumination states of the LED units have the same meanings as described earlier in conjunction with FIG. 18, for example.

As shown in FIG. 30, the input image $D_v$ is dark (here, with the minimum luminance) in its entirety in the first frame, and changes frame by frame to turn brighter from its right-edge portion and ultimately reach complete brightness (here, with the maximum luminance) in the fifth frame. The temporal change correction section 715 corrects LED data $D_{bf1}$ and $D_{bf2}$ determined in accordance with the input image. Concretely, when the luminance value changes to a predetermined threshold (e.g., 80% of the maximum luminance value) or more, as described earlier, a correction is performed to keep the amount of change lower (e.g., 50% of the amount of change).

In FIG. 30, upon transition from the first frame to the second frame, the right-edge portion of the image changes from dark state (at the minimum tone value 0) to bright state (at the maximum tone value 255). To inhibit a luminance change in response to such a considerable tone change, the temporal change correction section 715 corrects the value (luminance value) of the LED data $D_{bf2}$, which is provided to corresponding LED units (in the figure, the LED units being in the fourth column from the left) in the second frame, to an intermediate value for the luminance change (here, the intermediate luminance value 127).

In this manner, the luminance value for the fourth-column LED units in the second frame is not the maximum luminance value, and therefore the display state of the liquid crystal panel in the same frame does not allow complete reproduction of the input image (the brightness thereof), resulting in the display image being slightly dark (not having the maximum tone) in its right-edge portion.

Subsequently, in the third frame, the right half of the image, excluding the right-edge portion having already changed in the second frame, changes to bright state (the maximum tone value 255). To inhibit a luminance change in response to such a change, the temporal change correction section 715 corrects the luminance value of the LED data $D_{bf2}$, which is provided to corresponding LED units (in the figure, the LED units being in the third column from the left) in the third frame, to the intermediate value (the intermediate luminance value 127). Note that the luminance value of the LED data $D_{bf2}$ provided to the LED units in the fourth column from the left is not corrected for change inhibition because the amount of change from the corresponding luminance value does not exceed the threshold in the second frame.

Furthermore, it can be appreciated with reference to FIG. 30 that in each of the fourth and fifth frames also, the luminance value provided to LED units corresponding to the portion with a significant tone change is similarly corrected to the intermediate value.

On the other hand, in the case where no correction is performed as in the present embodiment, if such calculations as above are performed in parallel, simply for each unit frame time, the input image (the brightness thereof) is reproduced less completely than in the present embodiment, resulting in reduced display quality. This will be described below with reference to FIG. 31.

Figure 31:
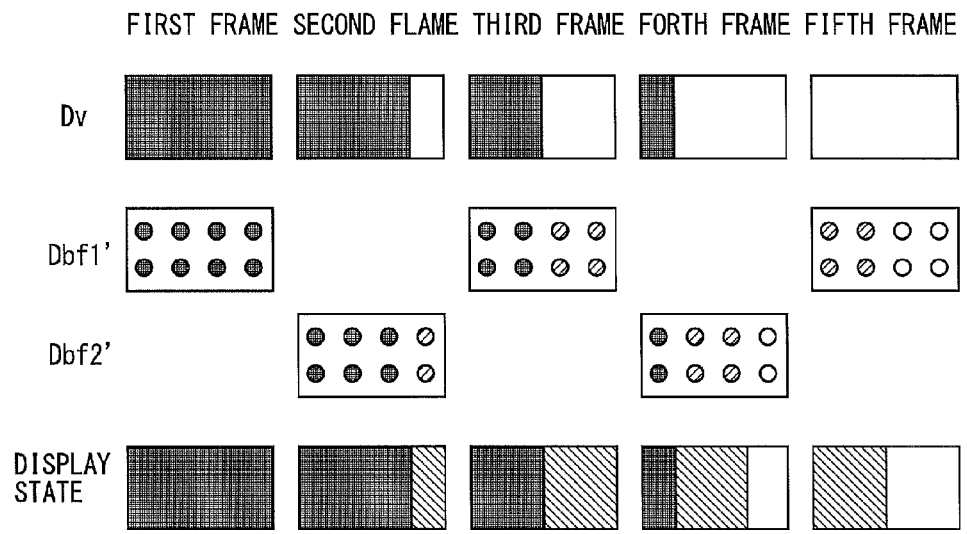
FIG. 31 is a diagram illustrating LED unit illumination states and liquid crystal panel display states in the case where an input image is the same as shown in FIG. 30 but correction in the embodiment is not performed.

FIG. 31 is a diagram illustrating LED unit illumination states and liquid crystal panel display states in the case where an input image is the same as shown in FIG. 30 and LED data is not corrected. As can be appreciated by comparing FIG. 31 with FIG. 30, the input image $D_v$ differs from the display image more significantly (i.e., the display is more incomplete) in the case shown in FIG. 31. The reason is that the luminance values of the LED units shown in FIG. 31 are intermediate in the fourth column of the third frame, the third column of the fourth frame, and the second column of the fifth frame. The reason that the values are intermediate is because LED data $D_{bf1'}$ corresponding to even frames and LED data $D_{bf2'}$ corresponding to odd frames are calculated independently of each other (without their details being exchanged). For example, in FIG. 31, the change from the minimum luminance value in the first frame to the maximum luminance value in the third frame is delayed by a time constant or suchlike, so that the luminance value assigned to the LED units in the fourth column of the third frame is intermediate. In this manner, when LED data is not cross-referenced in parallel calculations, LED luminance changes responsive to input image tone changes occur at later times than in the present embodiment where LED data for the immediately previous frame (i.e., one frame before) is referenced, resulting in reduced display quality. The LED data correction operation by the temporal change correction section 715 will be described next with reference to different input image examples.

Figure 32:
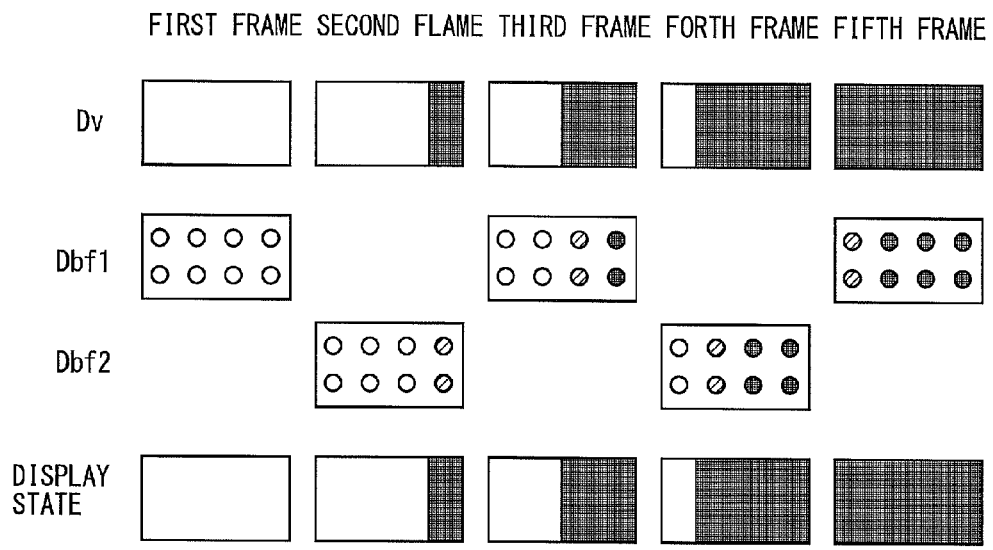
FIG. 32 is a diagram illustrating another example of a frame-by-frame change of an input image, an LED unit illumination state, and a liquid crystal panel display state in the embodiment.

FIG. 32 is a diagram illustrating another example of a frame-by-frame change of an input image, an LED unit illumination state, and a liquid crystal panel display state. As shown in FIG. 32, the input image $D_v$ is completely bright (at the maximum luminance) in the first frame, and turns completely dark (at the minimum luminance) in the fifth frame after becoming darker from its right edge portion every frame. The temporal change correction section 715 corrects the LED data $D_{bf1}$ and $D_{bf2}$ determined in accordance with the input image.

In FIG. 32, upon transition from the first frame to the second frame, the right edge portion of the image changes from bright (at the maximum tone value 255) to dark (at the minimum tone value 0) in the opposite manner to FIG. 30, and therefore the temporal change correction section 715 corrects the value (luminance value) of LED data $D_{bf2}$ provided to corresponding LED units (in the figure, the LED units being in the fourth column from left) in the second frame, so that the value is intermediate (here, the intermediate luminance value 127) for the luminance change.

However, unlike in the case of FIG. 30 where insufficient backlight luminance occurs, even if the luminance value of the LED units in the fourth column is not minimized in the second frame, the display state of the liquid crystal panel in that frame is such that (the brightness of) the input image can be completely reproduced. The reason for this is that the transmittance of the liquid crystal for the light from the LED units is set at 0. However, in such a case, basically, it is not necessary to light up the LED units (at the intermediate luminance value), which is different in the case of area-active control where backlights are turned off when portions of the image in their corresponding areas are displayed black in order to reduce power consumption. The same can be applied to the LED units in the third and second columns of the third to fifth frames.

However, even in the case of the present embodiment where no correction is performed, if such calculations as above are performed in parallel simply for each unit frame time, more power is consequently consumed than in the present embodiment. This will be described below with reference to FIG. 33.

Figure 33:
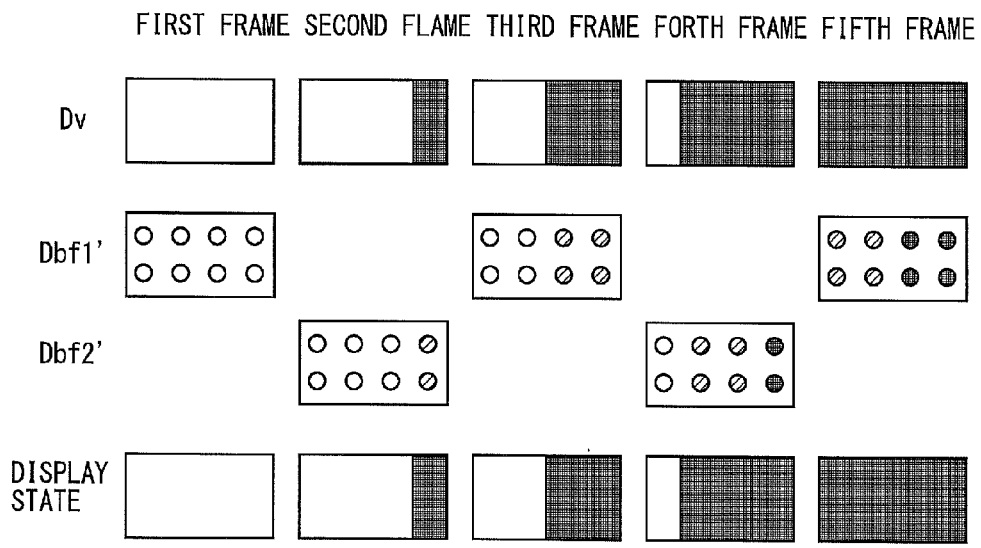
FIG. 33 is a diagram illustrating LED unit illumination states and liquid crystal panel display states in the case where an input image is the same as shown in FIG. 32 but correction in the embodiment is not performed.

FIG. 33 is a diagram illustrating LED unit illumination states and liquid crystal panel display states in the case where an input image is the same as shown in FIG. 32 and LED data is not corrected. As can be appreciated by comparing FIG. 33 with FIG. 32, a greater number of LED units are lit up at the intermediate luminance value in the case shown in FIG. 33. The reason that more LED units are at the intermediate value is because LED data $D_{bf1}$, corresponding to even frames and LED data $D_{bf2}$, corresponding to odd frames are calculated independently of each other (without their details being exchanged). For example, in FIG. 33, the change from the maximum luminance value in the first frame to the minimum luminance value in the third frame is delayed by a time constant or suchlike, so that the luminance value assigned to the LED units in the fourth column of the third frame is intermediate. In this manner, when LED data is not cross-referenced in parallel calculations, LED luminance changes responsive to input image tone changes occur at later times than in the present embodiment where LED data for the immediately previous frame (i.e., one frame before) is referenced, so that the LED units are lit up unnecessarily (at the intermediate luminance value), resulting in increased power consumption.

<4.5 Effect>

In this manner, the temporal change correction section 715 included in the odd-frame processing section 710 in the present embodiment receives LED data $D_{bf1}$ for odd frames and LED data $D_{bf2}$ for their immediately previous frames, which are even frames, and outputs (post-correction) LED data $D_{bf1}$ by correcting any luminance value whose amount of change is equal to or greater than a predetermined threshold among the luminance values being set for areas in immediately previous frames, such that the amount of change is less than the threshold, as will be described below. Thus, it is possible to prevent a reduction in display quality, or reduce power consumption in such a case where no reduction in display quality would occur, in accordance with the contents of the input image data, as described earlier.

Note that in the above configuration, input images are sorted alternatingly (into two groups) in units of a frame, but they may be sorted into three or more groups frame by frame, such that three or more types of input images are generated. Moreover, such sorting may be performed in units of multiple frames.

Furthermore, the configuration of the present embodiment achieves such a unique effect that flicker can be prevented in input images where image brightness significantly changes every frame (typically, a three-dimensional video in which left-eye and right-eye images are switched therebetween every frame). This will be described below with reference to FIGS. 34 and 35.

Figure 34:
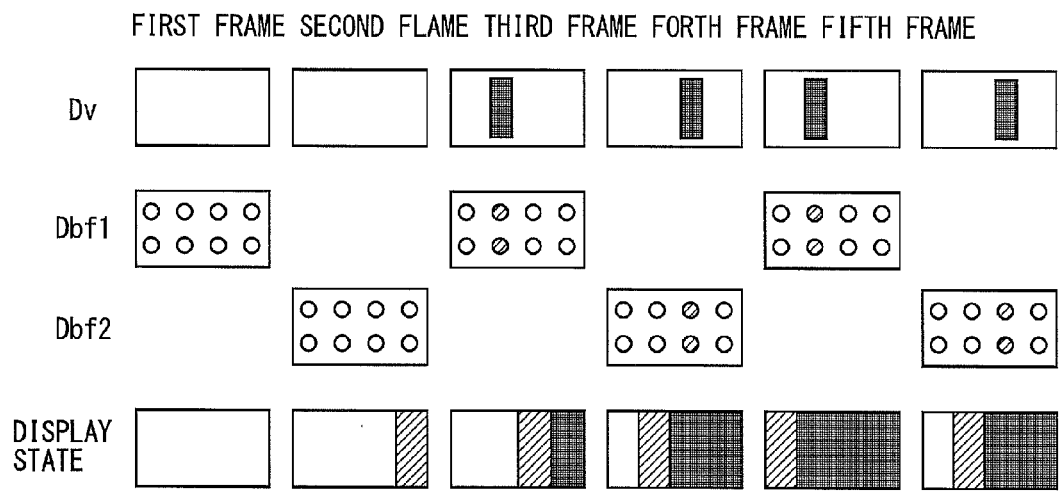
FIG. 34 is a diagram illustrating examples of input images in a three-dimensional video, LED unit illumination states, and liquid crystal panel display states in the embodiment.

FIG. 34 is a diagram illustrating examples of input images in a three-dimensional video, LED unit illumination states, and liquid crystal panel display states. As shown in FIG. 34, each of the third to sixth input images includes a dark (minimum luminance value) region, which changes its position between the left side of the center in the odd frames and the right side of the center in the even frames. These changes are intended for causing the positional difference in the horizontal direction between the left-eye and right-eye images included in the three-dimensional video to be recognized as the depth of the images. A general three-dimensional display device is used in combination with an eyewear-shaped shutter device capable of alternatingly blocking the user's left and right fields of view. This shutter device blocks the right-eye field of view when the display panel displays a left-eye image and blocks the left-eye field of view when a right-eye image is displayed. As a result, the positional difference in the horizontal direction between the two images can be artificially caused to be recognized as a parallax, so that the user can feel the depth of the images. Since the three-dimensional video is generated in this manner, there is a constant position difference in the horizontal direction between the left-eye and right-eye images, the left-eye image stays in approximately the same position in each frame, and the right-eye image stays in approximately the same position as well, so long as the depth that the user should feel does not change.

If images that change in such a manner are used as input images, and the LED data $D_{bf1}$ and $D_{bf2}$ are corrected as described earlier, the LED units in the second column are lit up at the intermediate luminance in the third and fifth frames, and the LED units in the third column are lit up at the intermediate luminance in the fourth and sixth frames, as shown in FIG. 34. Such illumination states continue in subsequent frames as well unless the contents of the input image change.

On the other hand, in the case where no correction is performed as in the present embodiment, if such calculations as above are performed in parallel simply for each unit frame time, flicker might occur. This will be described below with reference to FIG. 35.

Figure 35:
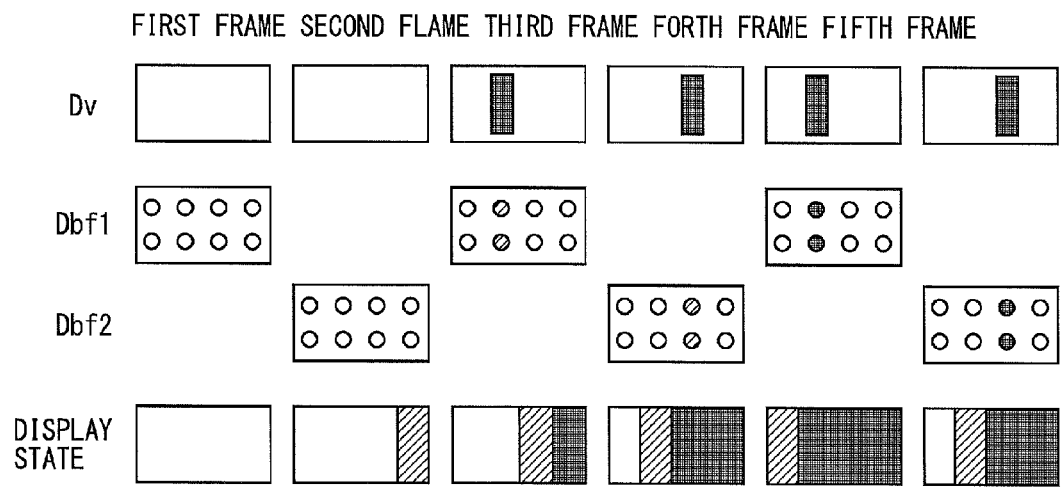
FIG. 35 is a diagram illustrating LED unit illumination states and liquid crystal panel display states in the case where an input image is the same as shown in FIG. 34 but correction in the embodiment is not performed.

FIG. 35 is a diagram illustrating LED unit illumination states and liquid crystal panel display states in the case where an input image is the same as shown in FIG. 34 and LED data is not corrected. As shown in FIG. 35, the LED units in the second or third column are lit up with the intermediate luminance in the third or fourth frame as in the case shown in FIG. 34, but in this configuration, a predetermined time constant delays luminance changes, as described above, and therefore unlike in the case shown in FIG. 34, the LED units in the second column are lit up (or unlit) with the minimum luminance in the fifth frame with the LED units in the third column being lit up with the maximum luminance. Subsequently in the sixth frame, the illumination state is opposite to the fifth frame, so that the LED units in the third column are lit up (or unlit) with the minimum luminance, and the LED units in the second column are lit up with the maximum luminance. Such illumination states continue in two subsequent frames as well unless the contents of the input image change. As a result, in such a state, the LED units in the second or third column are lit up and unlit in consecutive frames, so that viewers of the display would not recognize flicker.

In this manner, when LED data is not cross-referenced in parallel calculations, input image changes are reflected in units of two frames, unlike in the present embodiment where LED data for the immediately previous frame (i.e., one frame before) is referenced, resulting in flicker as shown in FIG. 35. As a result, the configuration of the present embodiment makes it possible to inhibit occurrence of flicker in a three-dimensional video.

<5. Fifth Embodiment>
<5.1 Overall Configuration and Operation>

A liquid crystal display device 2 according to a fifth embodiment of the present invention is configured so as to realize features of both the first and fourth embodiments. Specifically, as in the aforementioned parallel processing methods, the screen is divided into areas and also into time domains. The configuration and operation of an area-active drive processing section 5 for such parallel calculations will be described below with reference to FIG. 36.

<5.2 Configuration of the Area-active Drive Processing Section>

Figure 36:
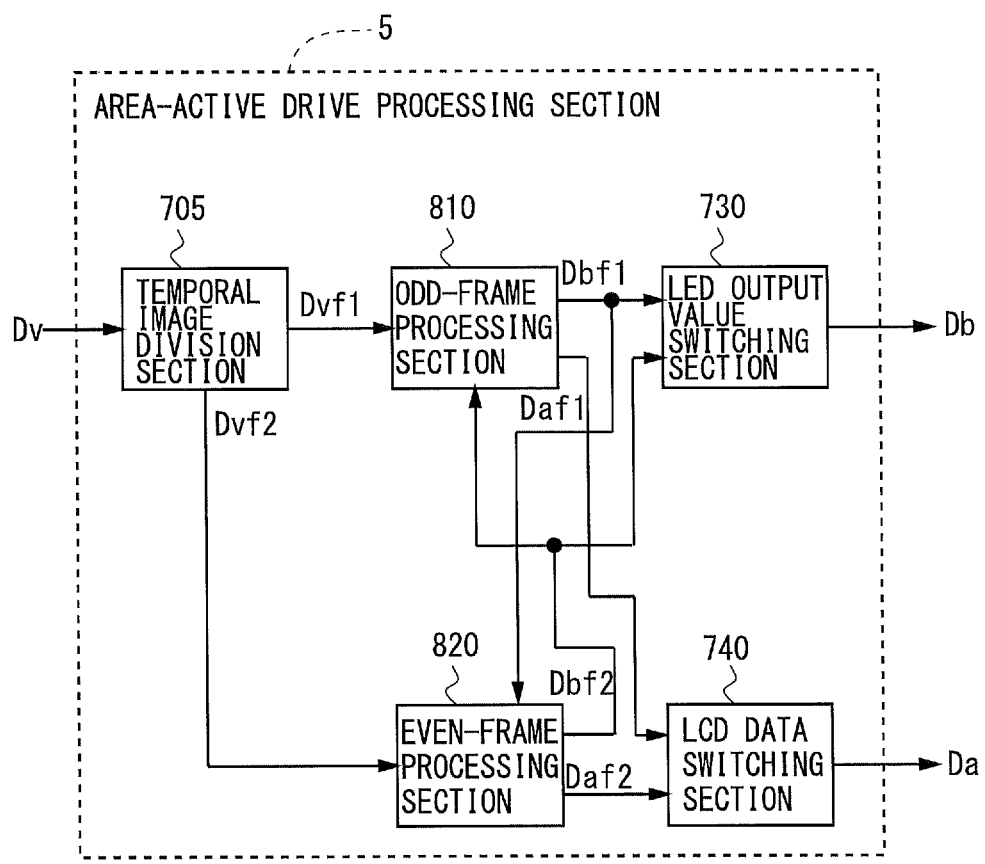
FIG. 36 is a block diagram illustrating in detail the configuration of an area-active drive processing section in a fifth embodiment of the present invention.

FIG. 36 is a block diagram illustrating in detail the configuration of the area-active drive processing section 5 in the present embodiment. The area-active drive processing section 5 shown in FIG. 36 includes a temporal image division section 705, which sorts input images frame by frame (in a time-division manner) for parallel processing as in the fourth embodiment, and odd-frame and even-frame processing sections 810 and 820, which perform regional division as in the first embodiment, as will be described later, and also includes the same output value switching section 730 and LCD data switching section 740 as in the fourth embodiment.

In the present embodiment, an input image $D_v$ is temporally divided into two input images by the temporal image division section 705 sorting odd frames from even frames, as in the fourth embodiment, and the odd-frame processing section 810 and the even-frame processing section 820 calculate the brightness of backlight sources in parallel (within two frame periods).

In the parallel calculations, the odd-frame processing section 810 and the even-frame processing section 820 exchange LED data (emission luminance data) $D_{bf1}$ and $D_{bf2}$, which are calculated backlight luminance data, (concretely, the data being alternatingly sent from one side to the other every frame, as will be described later), thereby referencing the backlight luminance for the last frame. As a result, it is possible to prevent the backlight luminance from significantly changing during one frame period. Thus, it is possible to inhibit occurrence of flicker (due to luminance changes) across the entire screen, thereby preventing a reduction in display quality. Moreover, the odd-frame processing section 810 and the even-frame processing section 820 perform regional division as in the first embodiment. This will be described below with reference to FIG. 37.

<5.3 Configuration of the Odd-frame Processing Section>

Figure 37:
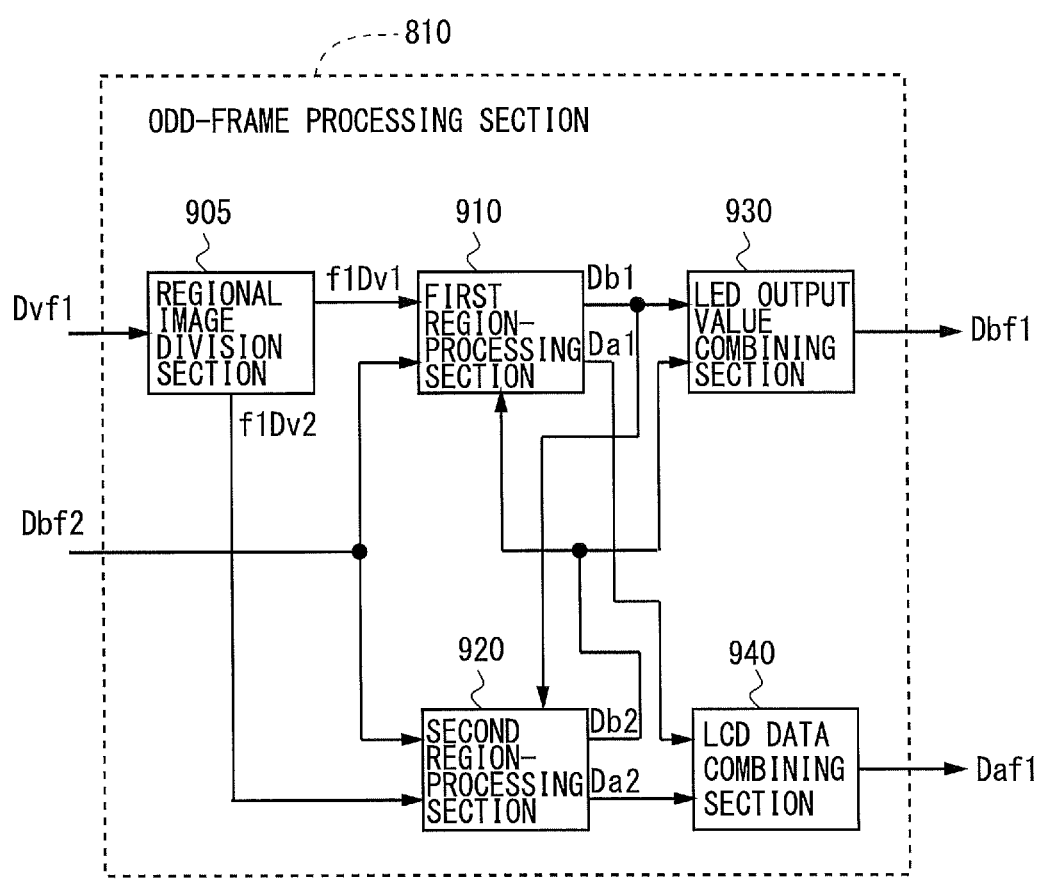
FIG. 37 is a block diagram illustrating in detail the configuration of an odd-frame processing section in the embodiment.

FIG. 37 is a block diagram illustrating in detail the configuration of the odd-frame processing section in the present embodiment. To divide an input image for parallel processing, the odd-frame processing section 810 shown in FIG. 37 includes a regional image division section 905, first and second region-processing sections 910 and 920, an LED output value combining section 930, and an LCD data combining section 940, which has the same function as that in the first embodiment.

In the present embodiment, the regional image division section 905 divides an odd-frame input image $D_{vf1}$ into two input images $f1D_{v1}$ and $f1D_{v2}$, and the first and second region-processing sections 910 and 920 calculate the brightness of backlight sources in parallel.

In the parallel calculations, the first and second region-processing sections 910 and 920 exchange LED data (emission luminance data) $D_{b1}$ and $D_{b2}$, which are calculated backlight luminance data, with each other, and receive LED data $D_{bf1}$ and $D_{bf2}$ for the immediately previous (even or odd) frames to reference both backlight luminances in each other's regions, which are not computed for their respective regions, and backlight luminances in the immediately previous frames.

Figure 38:
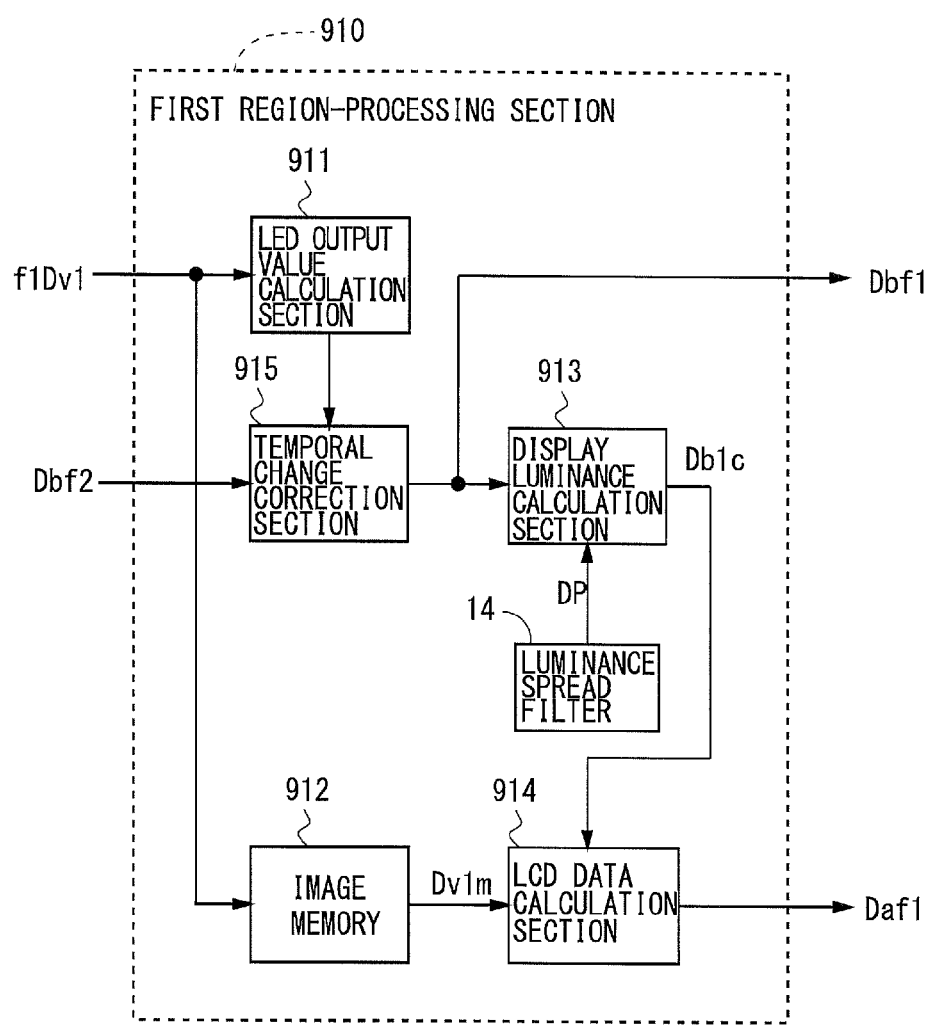
FIG. 38 is a block diagram illustrating in detail the configuration of a first region-processing section in the embodiment.

FIG. 38 is a block diagram illustrating in detail the configuration of the first region-processing section in the present embodiment. The first region-processing section 910 shown in FIG. 38 includes image memory 912 having the same function as that in the first embodiment, except that image data $f1D_{v1}$ for the left half of an odd frame is stored, an LCD data calculation section 914 having the same function as that in the first embodiment, except that liquid crystal data corresponding to the image data $f1D_{v1}$ is calculated, an LED output value calculation section 911 having the same function as that in the first embodiment, except that LED data corresponding to the image data $f1D_{v1}$ is calculated, and the same luminance spread filter 14 as in the first embodiment, and the first region-processing section 910 further includes a temporal change correction section 915 having the same function as that in the fourth embodiment. In the temporal change correction section 915, as in the temporal change correction section 715 of the fourth embodiment, among the luminance values being set for corresponding areas included in LED data $D_{bf2}$ for an immediately previous frame, which is an even frame, any luminance value whose amount of change is equal to or greater than a predetermined threshold is corrected such that the amount of change is less than the threshold, and (post-correction) LED data $D_{bf1}$ is outputted. As a result, when an area is illuminated by backlight sources in that area and its surrounding areas, it is possible to accurately calculate a display luminance equivalent to the actual brightness of the area in the frame (concretely, it is possible to perform luminance distribution calculations with accuracy). Thus, pixel display can be provided with correct display tones across the entire screen, thereby preventing a reduction in display quality.

<5.4 Effect>

As described above, in the present embodiment, input images $D_v$ are sorted into even and odd frames for parallel calculations, as in the fourth embodiment, and furthermore each image is divided into the right and left halves for parallel calculations, as in the first embodiment, so that a reduction in display quality can be prevented or power consumption can be reduced, as in the effect achieved by the fourth embodiment, and pixel display can be provided with correct display tones across the entire screen, thereby preventing a reduction in display quality, as in the effect achieved by the first embodiment.

Note that in the fifth embodiment, an input image is temporally divided into two regions, and then each region is further divided into two portions, thereby obtaining four input images, but the number of temporal divisions and the number of regional divisions are not limited. Moreover, after the regional division, each divided input image may be further temporally divided (frame by frame). In addition, in the fifth embodiment, unlike in the first embodiment, there might be no regional division performed, and backlight luminance data for an overlapping region around a boundary within an input image may be exchanged, as in the second or third embodiment. With such a configuration, the effect as achieved by the second or third embodiment can be achieved as well.

<6. Sixth Embodiment>

<6.1 Overall Configuration and Operation>

The configuration of the liquid crystal display device 2 according to a sixth embodiment of the present invention is the same as in the first embodiment in that an image is divided into regions, but differs from the first embodiment in that the image is divided into four (upper, lower, right, and left) regions. This will be described with reference to FIG. 39.

<6.2 Configuration of the Area-active Drive Processing Section>

Figure 39:
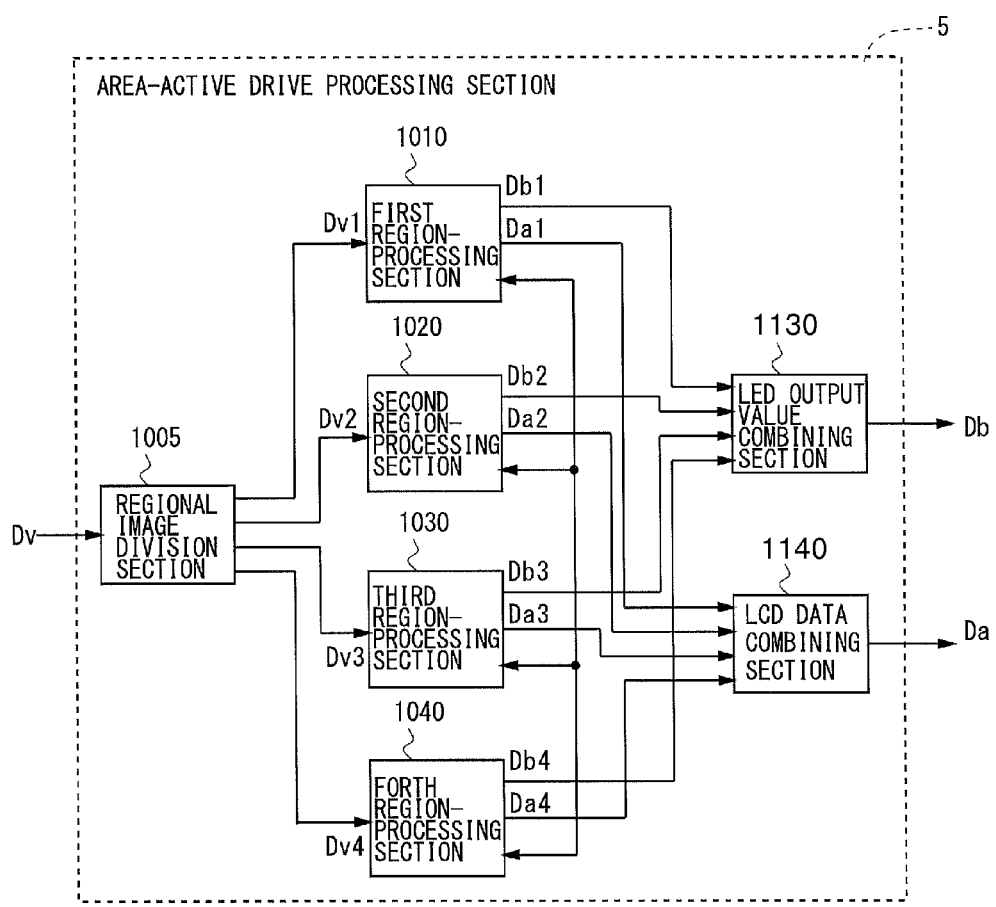
FIG. 39 is a block diagram illustrating in detail the configuration of an area-active drive processing section in a sixth embodiment of the present invention.

FIG. 39 is a block diagram illustrating in detail the configuration of the area-active drive processing section 5 in the present embodiment. To divide an input image into four portions for parallel processing, the area-active drive processing section 5 shown in FIG. 39 includes a regional image division section 1005, first to fourth region-processing sections 1010 to 1040, an LED output value combining section 1130, and an LCD data combining section 1140. The first to fourth region-processing sections 1010 to 1040 exchange LED data $D_{b1}$ to $D_{b4}$ therebetween. Since the first and fourth region-processing sections 1010 to 1040 are configured in the same manner and therefore operate in the same manner, the following description focuses on the configuration of the first region-processing section 1010 with reference to FIG. 40.

<6.3 Configuration of the First Region Processing Section>

Figure 40:
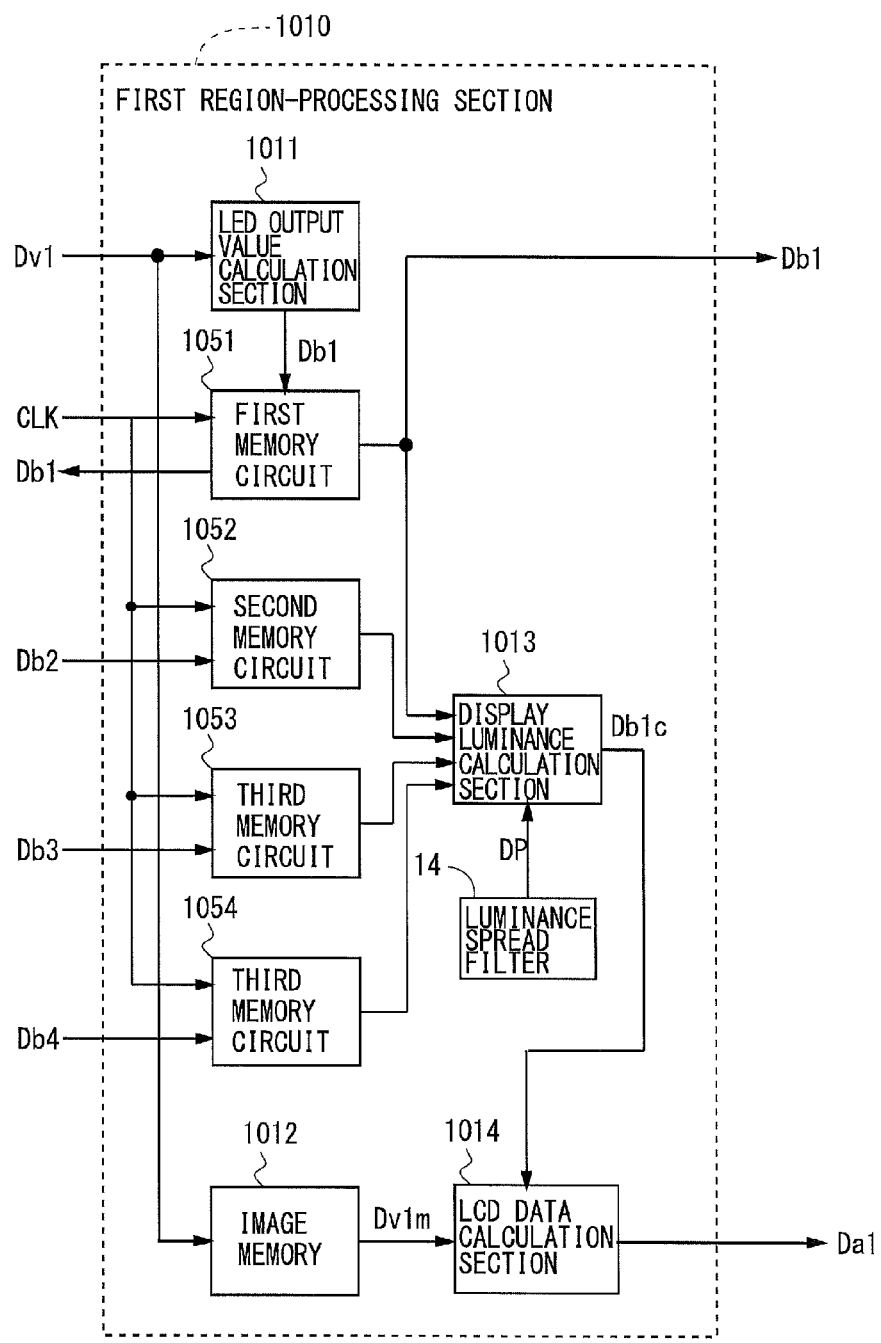
FIG. 40 is a block diagram illustrating in detail the configuration of a first region-processing section in the embodiment.

FIG. 40 is a block diagram illustrating in detail the configuration of the first region-processing section in the present embodiment. The first region-processing section 1010 includes image memory 1012 and a luminance spread filter 14, which are similar to their equivalents in the first embodiment, and also includes an LED output value calculation section 1011, a display luminance calculation section 1013, and an LCD data calculation section 1014, which have the same functions as their equivalents in the first embodiment, except that four data items corresponding to four regions are processed. Their operations are the same as in the first embodiment except that there are four divided regions, and therefore any descriptions thereof will be omitted herein.

Furthermore, in the present embodiment, first to fourth memory circuits 1051 to 1054 are further included as components for exchanging LED data $D_{b1}$ to $D_{b4}$ corresponding to four regions therebetween. The first to fourth memory circuits 1051 to 1054 are memory for memorizing their respective corresponding LED data $D_{b1}$ to $D_{144}$, and perform data reading and writing in accordance with a clock signal CLK outputted by an unillustrated clock generator. The clock signal CLK is formed in accordance with a vertical synchronization signal included in an inputted image signal or a timing signal generated on the basis of the vertical synchronization signal. As a result, the entire display device can be accurately timed using a simplified configuration. Note that the vertical synchronization signal may be used as a clock signal CLK without modification.

Here, among the LED data $D_{b1}$ to Db4, the LED data $D_{b1}$ is initially calculated by the LED output value calculation section 1011 and then written to the first memory circuit 1051, as in the first embodiment. Thereafter, the LED data $D_{b1}$ written in the first memory circuit 1051 is read in accordance with the clock signal CLK, and then written simultaneously or sequentially to unillustrated first memory circuits 1051 included in the second to fourth region-processing sections 1020 to 1040. In this manner, the LED data $D_{b2}$ to $D_{b4}$ are similarly written to the second to fourth memory circuits 1052 to 1054 included in the first to fourth region-processing sections 1010 to 1040 as well.

Note that the LED data $D_{b1}$ to $D_{b4}$ have been described herein as being exchanged for one another, but as described earlier in the first embodiment, the first region-processing section 1010 does not necessarily require all of the LED data $D_{b2}$, for example. Specifically, an image region targeted for computation by the first region-processing section 1010 is not affected by all backlight sources corresponding to an image region not targeted for computation (the image region being targeted for computation by the second or third region-processing section 1020 or 1030), and it is simply affected by its adjacent areas or its nearby areas (within a range of up to a few areas away, for example). Accordingly, the LED data $D_{b1}$ to $D_{b4}$ to be exchanged may be partial data corresponding to a range to be affected, concretely, data portions corresponding to areas adjacent to or near each other's regions.

Furthermore, the LED data $D_{b1}$ to $D_{b4}$ corresponding to four regions have been described as being exchanged for one another, but the number of regions is not limited, and for example, LED data $D_{b1}$ to $D_{b8}$ corresponding to eight regions may be exchanged for one another. However, in the configuration shown in FIG. 40, the number of wiring lines for data exchange increases as the number of data items to be exchanged increases, and therefore, in a more preferable configuration, for example, region-processing sections are connected by serial transmission lines to serially transmit the LED data $D_{b1}$ to $D_{b8}$.

Figure 41:
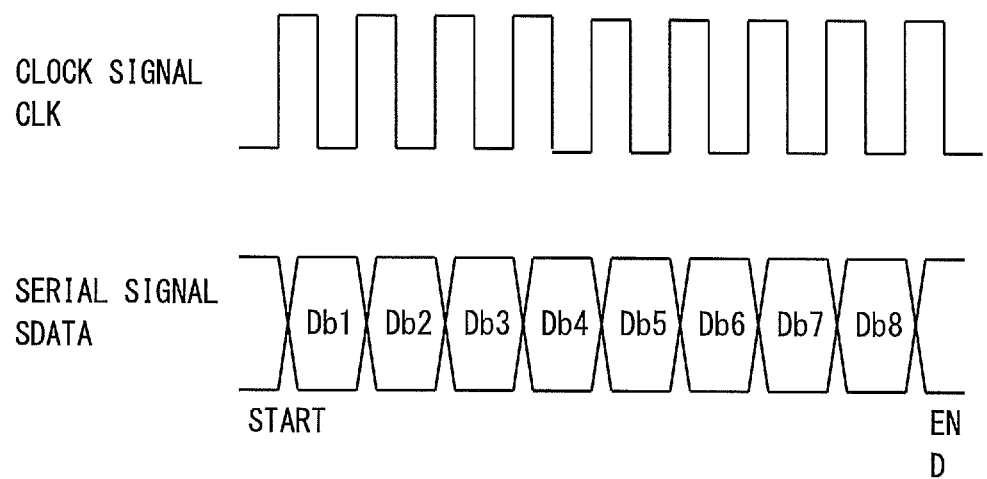
FIG. 41 is a timing chart schematically illustrating a clock signal and a serial data signal where LED data is serially transmitted in the embodiment.

FIG. 41 is a timing chart schematically illustrating a clock signal and a serial data signal where eight LED data items are serially transmitted. As shown in FIG. 41, data transmission over serial data signal SDATA starts and ends in synchronization with the clock signal CLK, such that LED data $D_{b1}$ to $D_{b8}$ are transmitted sequentially. Since serial data signal SDATA is transmitted on a serial transmission line, a large amount of LED data can be transmitted with such a simplified wiring configuration.

<6.4 Effect>

In this manner, in the present embodiment, even when an input image is divided into a larger number, for example, four, of regions than in the first embodiment, the same effect as that achieved by the first embodiment can be achieved with a simplified configuration.

INDUSTRIAL APPLICABILITY

The present invention is intended for image display devices, such as liquid crystal display devices, which include backlights, and is suitable for image display devices having their display panels driven with the luminance of a plurality of backlight sources being controlled on the basis of input images.

DESCRIPTION OF THE REFERENCE CHARACTERS 2 liquid crystal display device
3 backlight
4 backlight driver circuit
5 area-active drive processing section
6 panel driver circuit
7 liquid crystal panel
14 luminance spread filter
505, 1005 regional image division section
510, 610, 910, 1010 first region-processing section
520, 620, 920, 1020 second region-processing section
530, 630, 1130 LED output combining section
540, 640, 1140 LCD data combining section
511, 611, 711, 911, 1011 LED output value calculation section
512, 712, 912, 1012 image memory

513, 613, 713, 913, 1013 display luminance calculation section
514, 614, 714, 914, 1014 LCD data calculation section
615 overlapping region correction section
705, 805 temporal image division section
710, 810 even-frame processing section
715, 915 temporal change correction section
720, 820 odd-frame processing section
1051 to 1054 first to fourth memory circuits
1030 third region-processing section
1040 fourth region-processing section
$D_v$ input image
$D_a$ LCD data
$D_b$ LED data

The invention claimed is:

1. An image display device with a function of controlling a backlight luminance, comprising:
   a display panel including a plurality of display elements configured or programmed to control light transmittances;
   a backlight including a plurality of light sources;
   an image divider configured or programmed to generate a plurality of input images by subjecting a plurality of images included in a plurality of frames of an externally provided video signal to either regional division within each frame or temporal division in units of a frame, or both;
   a plurality of luminance calculators configured or programmed to set a plurality of areas in accordance with the light sources for the plurality of input images, to process the plurality of input images in parallel on the basis of the input image for the set areas, to calculate emission luminance data specifying luminance upon emission of the light source corresponding to the areas, and to process the plurality of input images in parallel on the basis of the emission luminance data calculated for the areas and its predetermined surrounding areas, to calculate display luminance, which is luminance for display provided in the areas;
   a display data calculator configured or programmed to obtain display data to control the light transmittances of the display elements, on the basis of the input images and the display luminances obtained by the luminance calculators;
   a panel driver circuit configured to programmed to output signals to the display panel on the basis of the display data, said signals controlling the light transmittances of the display element; and
   a backlight driver circuit configured or programmed to output signals to the backlight on the basis of the emission luminance data, said signals controlling the luminances of the light sources, wherein,
   each of the luminance calculators is configured or programmed to receive other emission luminance data calculated by the other luminance calculators or values used to calculate said other emission luminance data, and calculate the display luminance on the basis of the received other emission luminance data or values,
   the image divider is configured or programmed to generate a plurality of input images through regional division within each frame after the image included in the video signal is temporally divided in units of a frame,
   the plurality of luminance calculators include:
      a plurality of emission luminance calculators configured or programmed to perform parallel processing to obtain the emission luminance data respectively corresponding to the input images within the same frame, the number of emission luminance calculators corresponding to the number of partitions of temporal divisions, and the parallel processing being performed frame by frame; and
      a plurality of display luminance calculators configured or programmed to perform parallel processing to obtain the display luminances respectively corresponding to the input images within the same frame, the number of display luminance calculators corresponding to the number of partitions of temporal divisions, and the parallel process being performed frame by frame, and
   when the emission luminance data calculated by a corresponding emission luminance calculator changes from other emission luminance data calculated by another emission luminance calculator for an immediately previous input image and the change is greater than or equal to a predetermined threshold, the display luminance calculator is configured or programmed to calculate the display luminance on the basis of emission luminance data obtained by subtracting a predetermined amount less than the threshold from the other emission luminance data.

2. The image display device according to claim 1, wherein, the image divider is configured or programmed to generate the input images through regional division of the image included in the video signal,
   the plurality of luminance calculators include:
      a plurality of emission luminance calculators configured or programmed to obtain the emission luminance data respectively corresponding to the input images through parallel processing; and
      a plurality of display luminance calculators configured to programmed to obtain the display luminances respectively corresponding to the input images through parallel processing, and
   each of the display luminance calculators is configured or programmed to calculate the display luminance on the basis of the emission luminance data calculated by the corresponding emission luminance calculator and other emission luminance data calculated by and received from other emission luminance calculators, said other emission luminance data at least including emission luminance data for a plurality of areas being set for predetermined regions adjacent to a corresponding input image.

3. The image display device according to claim 1, wherein, the image divider is configured or programmed to generate the input images through regional division of the image included in the video signal,
   the plurality of luminance calculators include:
      a plurality of emission luminance calculators configured or programmed to obtain the emission luminance data respectively corresponding to the input images through parallel processing; and
      a plurality of display luminance calculators configured or programmed to obtain the display luminances respectively corresponding to the input images through parallel processing,
   each of the emission luminance calculators is configured or programmed to calculate candidate values for emission luminance data for a plurality of areas being set for a corresponding input image and predetermined regions adjacent to the input image, and to obtain emission luminance data to be provided to a corresponding display luminance calculator, on the basis of the calculated candidate values for the emission luminance data and candidate values for other emission luminance data calculated by and received from other emission luminance calculators, and the display luminance calculators are configured or programmed to calculate the display luminances on the basis of the emission luminance data provided by the corresponding emission luminance calculators.

4. The image display device according to claim 3, wherein the emission luminance calculator is configured or programmed to obtain a maximum of the candidate values for the received other emission luminance data and the calculated emission luminance data as emission luminance data to be provided to the corresponding display luminance calculator.

5. The image display device according to claim 3, wherein the emission luminance calculator is configured or programmed to obtain an intermediate value as emission luminance data to be provided to the corresponding display luminance calculator, the intermediate value being defined by a predetermined ratio between the maximum and the minimum of the candidate values for the received other emission luminance data and the emission luminance data calculated by the emission luminance calculator.

6. The image display device according to claim 1, wherein, the image divider is configured or programmed to generate the input images through temporal division of the image included in the video signal, the plurality of luminance calculators include:
a plurality of emission luminance calculators configured or programmed to obtain the emission luminance data respectively corresponding to the input images through parallel processing; and
a plurality of display luminance calculators configured to programmed to obtain the display luminances respectively corresponding to the input images through parallel processing, and when the emission luminance data calculated by a corresponding emission luminance calculator changes from other emission luminance data calculated by another emission luminance calculator for an immediately previous input image and the change is greater than or equal to a predetermined threshold, the display luminance calculator is configured or programmed to calculate the display luminance on the basis of emission luminance data obtained by subtracting a predetermined amount less than the threshold from the other emission luminance data.

7. The image display device according to claim 6, wherein the image divider is configured or programmed to receive a three-dimensional video signal alternating between left-eye and right-eye images frame by frame, and sort the received three-dimensional video signal alternatingly in units of a frame, thereby generating the input images consisting of input images that are the left-eye images and input images that are the right-eye images.

8. The image display device according to claim 1, wherein each of the plurality of luminance calculators is configured or programmed to transmit the calculated other emission luminance data or values used to calculate said other emission luminance data, in synchronization with a vertical synchronization signal included in the video signal.

9. A method for controlling an image display device having a function of controlling a backlight luminance and being provided with a backlight including light sources and a display panel including a plurality of display elements configured to display a plurality of pixels by transmitting light from the light sources therethrough, the method comprising:

an image division step of generating a plurality of input images by subjecting a plurality of images included in a plurality of frames of an externally provided video signal to either regional division within each frame or temporal division in units of a frame, or both;

a plurality of luminance calculation steps of setting a plurality of areas in accordance with the light sources for the plurality of input images, processing the plurality of input images in parallel on the basis of the input image for the set areas, to calculate emission luminance data specifying luminance upon emission of the light source corresponding to each of the areas, and processing the plurality of input images in parallel on the basis of the emission luminance data calculated for the areas and its predetermined surrounding areas, to calculate display luminance, which is luminance for display provided in the areas;

a display data calculation step of obtaining display data to control the light transmittances of the display elements, on the basis of the input images and the display luminances obtained by the luminance calculation steps;

a panel drive step of outputting signals to the display panel on the basis of the display data, said signals controlling the light transmittances of the display element; and a backlight drive step of outputting signals to the backlight on the basis of the emission luminance data, said signals controlling the luminances of the light sources, wherein, in each of the luminance calculation steps, other emission luminance data calculated in other luminance calculation steps or values for calculating said other emission luminance data are received, and the display luminance is calculated on the basis of the received other emission luminance data or values, the image division step divides a plurality of input images through regional division within each frame after the image included in the video signal is temporally divided in units of a frame, the plurality of luminance calculation steps include:
a plurality of emission luminance calculation steps which perform parallel processing to obtain the emission luminance data respectively corresponding to the input images within the same frame, the number of emission luminance calculators corresponding to the number of partitions of temporal divisions, and the parallel processing being performed frame by frame; and
a plurality of display luminance calculation steps which perform parallel processing to obtain the display luminances respectively corresponding to the input images within the same frame, the number of display calculation steps corresponding to the number of partitions of temporal divisions, and the parallel processing being performed frame by frame, and when the emission luminance data calculated by a corresponding emission luminance calculation step changes from other emission luminance data calculated by another emission luminance calculation step for an immediately previous input image and the change is greater than or equal to a predetermined threshold, the display luminance calculation step calculates the display luminance on the basis of emission luminance data obtained by subtracting a predetermined amount less than the threshold from the other emission luminance data.

* * * * *